United States Patent
Rampen et al.

(10) Patent No.: US 12,123,326 B2
(45) Date of Patent: Oct. 22, 2024

(54) APPARATUS AND METHODS FOR THE STORAGE OF ENERGY AS HEAT

(71) Applicant: SYNCHROSTOR LIMITED, Edinburgh Lothian (GB)

(72) Inventors: William Rampen, Lothian (GB); Carn Gibson, Edinburgh Lothian (GB); Tommaso Serra, Milan (IT)

(73) Assignee: SYNCHROSTOR LIMITED, Edinburgh (GB)

( * ) Notice: Subject to any disclaimer, the term of this patent is extended or adjusted under 35 U.S.C. 154(b) by 0 days.

(21) Appl. No.: 17/767,864

(22) PCT Filed: Oct. 9, 2020

(86) PCT No.: PCT/GB2020/052532
§ 371 (c)(1),
(2) Date: Apr. 8, 2022

(87) PCT Pub. No.: WO2021/069929
PCT Pub. Date: Apr. 15, 2021

(65) Prior Publication Data
US 2024/0084719 A1    Mar. 14, 2024

(30) Foreign Application Priority Data
Oct. 9, 2019 (GB) .................................. 1914582

(51) Int. Cl.
*F01K 3/12* (2006.01)
*F28D 20/00* (2006.01)

(52) U.S. Cl.
CPC ............ *F01K 3/12* (2013.01); *F28D 20/0056* (2013.01)

(58) Field of Classification Search
None
See application file for complete search history.

(56) References Cited

U.S. PATENT DOCUMENTS 5,924,305 A * 7/1999 Hill ........................... F25B 9/14
60/671
2010/0218500 A1* 9/2010 Ruer ......................... F01K 7/36
60/659

(Continued)

FOREIGN PATENT DOCUMENTS

EP    0 215 459    3/1987
EP    0 361 927    4/1990

(Continued)

OTHER PUBLICATIONS

International Search Report for PCT/GB2020/052532 mailed Jan. 19, 2021, 5 pages.

(Continued)

*Primary Examiner* — Shafiq Mian
(74) *Attorney, Agent, or Firm* — Nixon & Vanderhye P.C.

(57) ABSTRACT

A pumped heat storage apparatus has a prime mover, a power take off, first and second fluid working machines functioning as a compressor (8) and as an expander (10), a working fluid circulation pathway with high and low pressure sides, and high and low temperature heat exchangers (18A-B). The heat exchangers operate using direct contact between gaseous working fluid and solid thermal storage media, such as glass beads, which move in opposite directions, typically using an augur (44). The system is reversible between energy storage and energy recovery modes and when it reverses, the direction of movement of the working fluid and the thermal storage media reverses. The apparatus may very rapidly swap between energy storage and energy recovery while having a high capacity and energy throughout.

32 Claims, 15 Drawing Sheets

(56) References Cited

U.S. PATENT DOCUMENTS

| | | | |
|---|---|---|---|
| 2010/0251711 A1* | 10/2010 | Howes | F01K 3/12 |
| | | | 60/659 |
| 2012/0180988 A1 | 7/2012 | Laforce | |
| 2018/0187572 A1* | 7/2018 | Apte | F01K 3/02 |
| 2018/0187628 A1* | 7/2018 | Apte | F02G 1/055 |
| 2019/0162482 A1* | 5/2019 | Kerth | F28C 3/14 |
| 2021/0148305 A1* | 5/2021 | Barton | F02G 1/055 |
| 2022/0403758 A1* | 12/2022 | Roskilly | F01K 25/08 |

FOREIGN PATENT DOCUMENTS

| | | |
|---|---|---|
| EP | 0 494 236 | 7/1992 |
| EP | 1 537 333 | 8/2005 |
| EP | 2 698 506 | 2/2014 |
| WO | 2009/44139 | 4/2009 |

OTHER PUBLICATIONS

Written Opinion of the ISA for PCT/GB2020/052532 mailed Jan. 19, 2021, 11 pages.

* cited by examiner

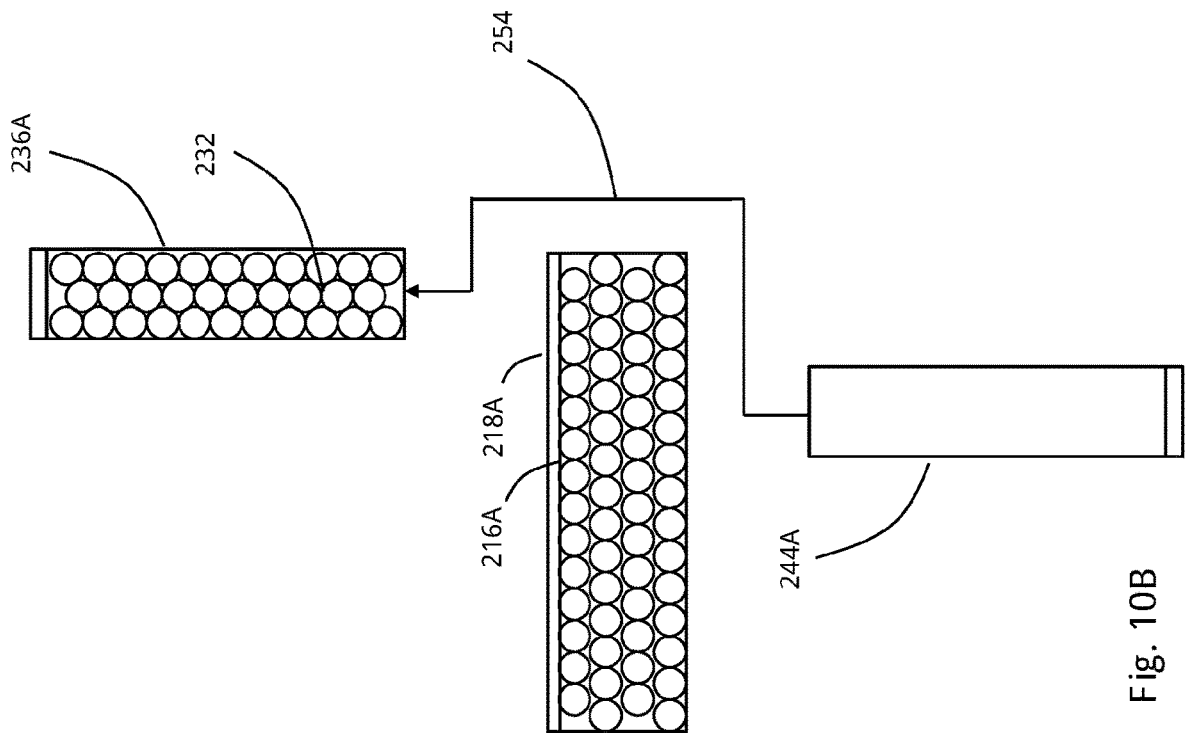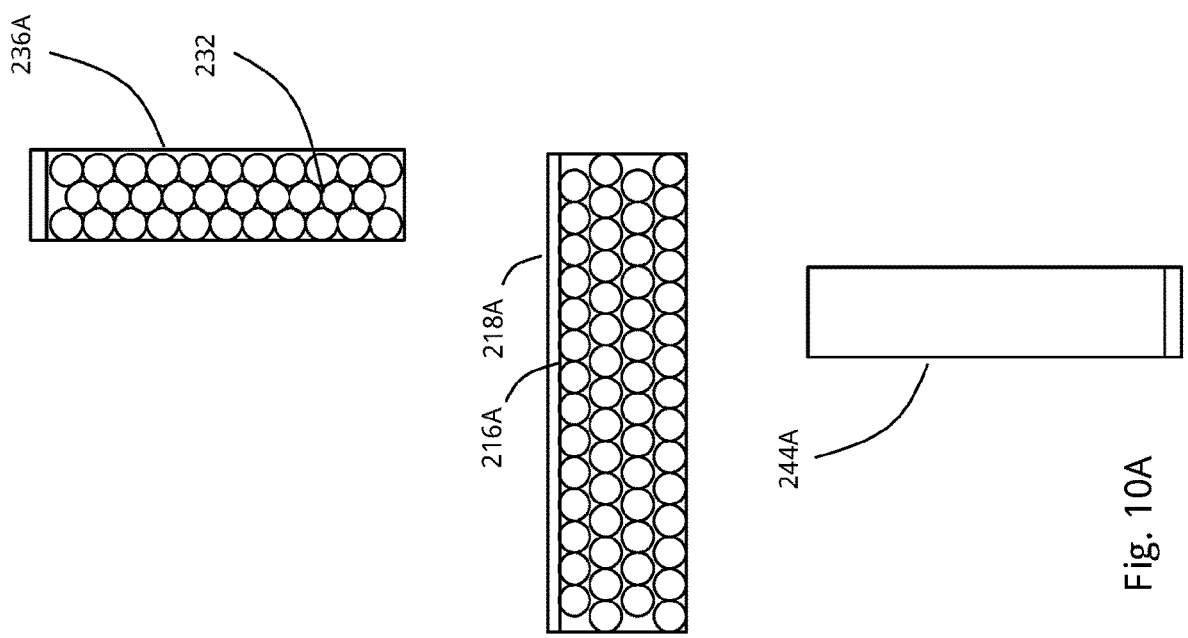

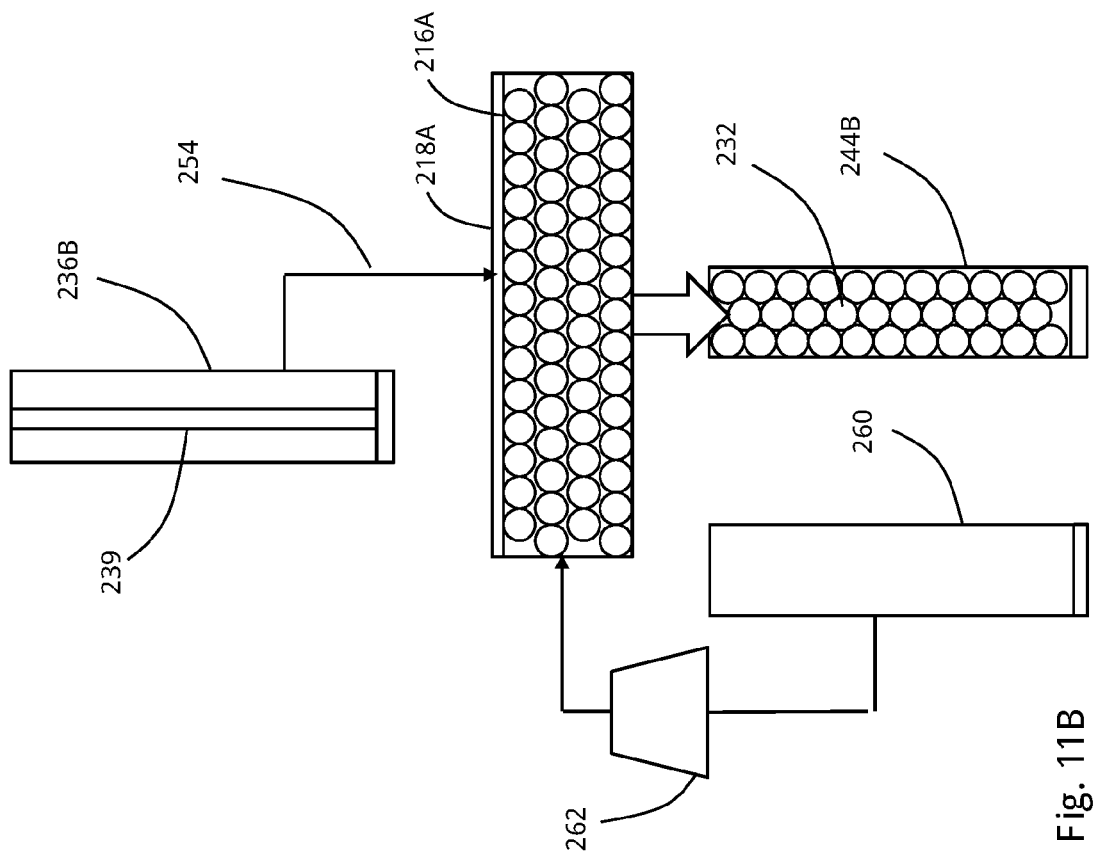
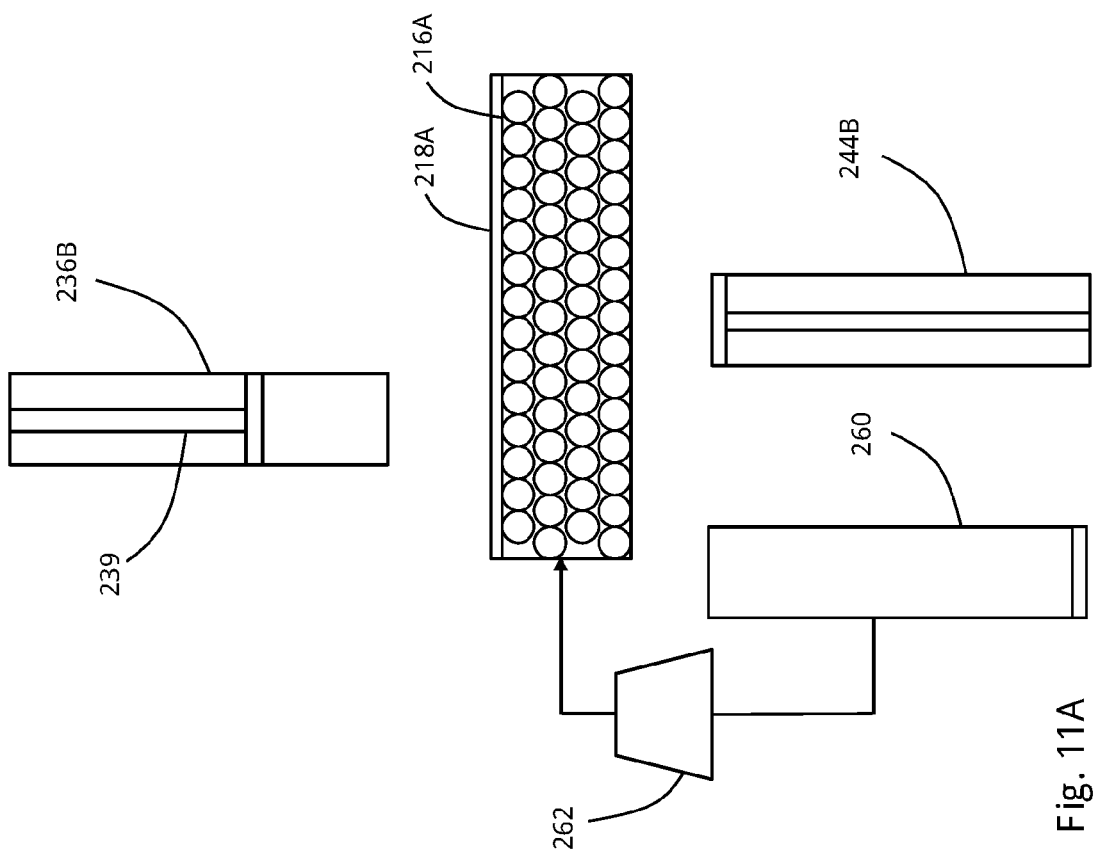

APPARATUS AND METHODS FOR THE STORAGE OF ENERGY AS HEAT

This application is the U.S. national phase of International Application No. PCT/GB2020/052532 filed Oct. 9, 2020 which designated the U.S. and claims priority to GB 1914582.0 filed Oct. 9, 2019, the entire contents of each of which are hereby incorporated by reference.

FIELD OF THE INVENTION

The invention relates to the field of apparatus and methods for storing energy as heat energy and subsequently retrieving the energy.

BACKGROUND TO THE INVENTION

Pumped heat energy storage systems are known in which a prime mover, driven by an energy source (for example an electricity supply) drives a compressor for working fluid within a working fluid circuit. An expander, coupled to the compressor, expands working fluid in the circuit and also drives the compressor. Thus, a working fluid (whether a gas or a liquid) is pressurised and heated adiabatically by the action of the compressor and a first (high temperature/high pressure side) heat exchanger transfers energy from the working fluid to a heat store, being a mass of a material with a suitably high heat capacity, which heats up. This step is typically isobaric and the pressurised working fluid which has given up heat is then expanded and cooled adiabatically by the action of the expander. A second (low temperature/low pressure side) heat exchanger transfers energy from a cold store, being a further mass of material with a suitably high heat capacity, which is thereby cooled. This heat exchange step is again typically isobaric and the warmed working fluid is then recirculated to the compressor. Energy from the energy source is thereby used to transfer heat energy from the cold store to the heat store, thereby storing energy. In order to retrieve the energy, the thermodynamic process is effectively operated in reverse and a power take-off (such as an electricity generator) coupled to the compressor and the expander outputs recovered (regenerated) energy.

These devices are referred to as pumped heat energy storage systems as the energy source is effectively used to drive a heat pump. The direction of energy flow is then in effect reversed and the stored heat energy is used to drive power take off. An example of such a system disclosed in WO 2009/44139 (MacNaghten et al.) Although known systems have shown promise they face a number of technical challenges relating to reliability, efficiency and/or cost.

Some embodiments of the invention make use of thermal storage media which is moved, in use, from a first container to a second container, through the hot side or cold side heat exchanger as appropriate. The transportation of thermal storage media enables, losses in the energy storage and recovery processes to be minimised and the size of the heat exchanger to be reduced. In general the invention seeks to provide apparatus with a good storage and recovery efficiency, and a good capacity, for a given size.

Typical heat exchangers use indirect contact between a gas and a thermal storage medium, through the wall of a heat exchanger, increasing the size of the heat exchanger and reducing efficiency and power throughput. Gas to liquid direct contact heat exchangers and known but have poor efficiency once the gas flow rate exceeds the flooding point. If they are operated below this point then they have good efficiency but a low rating. The present invention employs a direct contact heat exchanger in which heat flows directly between a gaseous working fluid and a solid thermal storage media. This arrangement has the potential to be efficient at high rates of energy storage or use, but transporting the thermal storage media into or out of highly pressurised thermal storage media containers presents a substantial technical challenge. Practical challenges mean that existing devices require separate apparatus (e.g. separate heat exchangers and/or containers for thermal storage media) for heat energy storage and heat energy recovery.

The present invention seeks to address the above and other problems with pumped heat energy storage systems. Some aspects of the invention address technical problems relating particularly to heat exchangers useful for such apparatus. Some aspects of the invention address technical problems relating to moving solid thermal storage media across a pressure gradient, into or out of a direct contact heat exchanger.

SUMMARY OF THE INVENTION

According to a first aspect of the invention there is provided a pumped heat energy storage apparatus comprising a working fluid circulation pathway retaining working fluid and a heat exchanger, the heat exchanger having a heat exchange chamber configured to bring thermal storage media into direct contact with working fluid in the working fluid circulation pathway to thereby exchange heat energy between the working fluid and the thermal storage media, wherein the working fluid is typically a gas within the heat exchange chamber and wherein the thermal storage media is a solid, wherein the heat exchanger is configured to cause received thermal storage media to be moved into and out of (typically through) the heat exchange chamber, and wherein the heat exchanger is reversible to transfer heat energy from the working fluid to the thermal storage media or vice versa in alternative first and second operating modes.

According to a second aspect of the invention there is provided a method of operating a pumped heat energy storage apparatus, the apparatus comprising a working fluid circulation pathway retaining working fluid and a heat exchanger, the method comprising the step of receiving thermal storage media into a heat exchange chamber of the heat exchanger, contacting the thermal storage media with typically gaseous working fluid within the heat exchange chamber, and then outputting the thermal storage media from the heat exchange chamber, wherein the heat exchanger is reversible to transfer heat energy from the working fluid to the thermal storage media or vice versa in alternative first and second operating modes. Typically, in the first operating mode, the thermal storage media passes through the heat exchange chamber in a first direction and in the second operating mode the thermal storage media passes through the heat exchange chamber in the opposite direction.

Typically, the working fluid circulation path comprises a high pressure side and a low pressure side, with a said heat exchanger in the high pressure side (functioning as a high temperature heat exchanger). Typically the working fluid circulation path comprises a further heat exchanger (a low temperature heat exchanger) in the low pressure side. Thus the heat exchanger may be a high pressure side (high temperature) heat exchanger. The heat exchanger may be a low pressure side (low temperature) heat exchanger. The further heat exchanger may also be reversible to transfer heat energy from the working fluid to the thermal storage media or vice versa in alternative first and second operating modes of the further heat exchanger, wherein in the first operating mode of the further heat exchanger the working fluid cools thermal storage media and in the second operating mode of the further heat exchanger, thermal storage media warms working fluid. Other optional features of the heat exchanger described herein may also be features of the further heat exchanger. The further heat exchanger may be a corresponding heat exchanger.

The working fluid is typically a gas within the heat exchange chamber. The working fluid may remain a gas around the whole of the working fluid circulation pathway. However, it may be that the working fluid is a gas within the heat exchange chamber but a liquid at another portion of the working fluid circulation pathway. It may be the working fluid circulation pathway comprises a high temperature heat exchanger (which is the abovementioned heat exchanger) and also a low temperature heat exchanger (which may be the further heat exchanger) and the working fluid is a gas within the high temperature heat exchanger and is at least in part a liquid within the low temperature heat exchanger. This might occur if, for example, the working fluid is carbon dioxide. In some embodiments the working fluid may be a liquid within the heat exchange chamber.

By a compressor and an expander we refer to machines which compress or expand a fluid respectively. Thus, by a compressor we include a pump and by an expander we include a motor. It may be that the working fluid is a liquid in one or both of the compressor or the expander in which case the working fluid is pumped by the compressor or expanded by the motor. The compressor and expander are typically positive displacement machines. The compressor and expander may be different parts of the same machine, for example they may comprise different groups of one or more working chambers (e.g. cylinders) of a fluid working machine.

It may be that the apparatus is configured so that in a first operating mode, the thermal storage media is received from a first media store into the heat exchanger and in the second operating mode the thermal storage media is output from the heat exchanger and transferred to the first media store. It may be that the apparatus is configured so that in the first operating mode, the thermal storage media is output from the heat exchanger and transferred to a second media store, and that in the second operating mode the thermal storage media received into the heat exchanger from the second media store. The first operating mode may comprise receiving thermal storage media into the heat exchanger from a first media store (optionally to a second media store) and the second operating mode may comprise outputting thermal storage media to the first media store (and optionally receiving thermal storage media from the second media store).

It may be that the apparatus is configured so that in a first operating mode, the thermal storage media is received from a first media store and moved through the heat exchange chamber in a first direction. It may be that in the second operating mode the thermal storage media is moved through the heat exchange chamber in a second direction which is the reverse of the first direction. It may be that in the second operating mode the thermal storage media is returned to the first media store. It may be that in the first operating mode the thermal storage media is output to a second media store. It may be that in the second operating mode the thermal storage media is received from the second media store. It may be that the direction of movement of the thermal storage media through the heat exchange chamber reverses when the apparatus switched from the first operating mode to the second operating mode.

It may be that the apparatus is configured so that in a first operating mode, the thermal storage media is received from a first media store and input into the heat exchanger and that in the second operating mode, the thermal storage media is output from the heat exchanger (and typically also returned to the first media store) on a last in first out basis, at least initially when the apparatus changes from the first operating mode to the second operating mode. It may be that the apparatus is configured so that in the first operating mode, the thermal storage media is output from the heat exchanger and transferred to a second media store, and that in the second operating mode, the thermal storage media is received from the second media store into the heat exchanger on a last out first in basis.

It may be that the heat exchange apparatus is configured to transport the thermal storage media through the heat exchange chamber using a motor. This contrasts with the use of gravity. It may be that the heat exchange apparatus is configured to transport thermal storage media through the heat exchange chamber at a slope of less than ±5°, relative to horizontal, and typically substantially horizontal. Typically, the majority of the volume of the heat exchange chamber is defined by a pipe which extends at a slope of less than ±5°, relative to horizontal, and typically substantially horizontal.

The thermal storage media may be discrete particles, for example beads or blocks. The solid thermal storage media may alternatively be formed into an elongate body, which may be rigid (e.g. an elongate bar) or flexible (e.g. a chain). Typically the thermal storage media comprises discrete particles and the heat exchanger comprises a conveyor, such as an auger configured to transport the thermal storage media through the heat exchange chamber. Typically, a motor drives rotation of the conveyor (e.g. auger). The direction of movement of the conveyor (e.g. auger) is typically reversible. The direction of rotation of the auger is typically reversible. Thus the auger transports the thermal storage media through the heat exchange chamber in a first direction or opposite second direction in the first and second operating modes respectively. The auger may have an axis which is at a slope of less than ±5°, relative to horizontal, and typically substantially horizontally. This facilitates reversal of the direction of movement of the thermal storage media through the heat exchange chamber. The auger and the heat exchange chamber (and typically the heat exchanger) may be coaxial.

Typically, thermal storage media does not pass through the heat exchange chamber by the effect of gravity alone. Nevertheless, it may be that the heat exchange chamber extends between first and second ends, and at each end there is a gravity fed port for receiving thermal storage media from a media store in the first operating mode and a separate second port for outputting thermal storage media back to the same media store in the second operating mode, using elevator means (such as an elevator, typically an auger). The second port may comprise a pit into which thermal storage media (e.g. particles) fall, and typically from which they are lifted using elevator means.

The heat exchanger may comprise one or more weirs which function to maintain the depth of thermal storage media (e.g. particles) within the heat exchange chamber. It is preferable to keep the heat exchange chamber filled with thermal storage media up to as close to the top of the heat exchange chamber as possible to avoid providing a path for working fluid to pass over the thermal storage media without interacting with it. A said weir may be located between a central region of the heat exchange chamber and the said second port. Where the second port is a pit it may comprise a wall around the pit.

It may be that the apparatus is configured so that in the first operating mode working fluid flows through the heat exchange chamber along one or more first paths and in the second operating mode working fluid flow through the heat exchange chamber in the opposite direction along the one or more first paths.

It may be that when the apparatus swaps between the first and the second operating modes, the apparatus swaps between energy storage and energy recovery (regeneration) or vice versa, the direction of heat energy flow between the working fluid and the thermal storage media reverses and the thermal storage media received from a first media store is returned to the first media store. Typically, the direction of flow of the working fluid through the heat exchange chamber reverses. Typically, the direction of movement of the thermal storage media through the heat exchange chamber reverses. Where there are first and second heat exchangers, typically the direction of working fluid and the direction of movement of thermal storage media through the heat exchange chamber of each heat exchanger reverses.

Typically, the heat exchanger is located in a section of the working fluid circulation pathway and wherein the direction of working fluid flow through the section of the working fluid circulation pathway reverses between the first and second operating modes, such that in the first operating mode the working fluid flows in a first direction and in the second direction the working fluid flows in the opposite direction (through the heat exchange chamber). Typically, in the first operating mode the working fluid flows in the first direction from the output of a compressor to the input of an expander and in the second direction the working fluid flows in the opposite direction from the output of a compressor to the input of an expander. It may be that in the first and second operating modes, the compressor and expander swap functions (the machine which is a compressor in the first operating modes functions as an expander in the second operating mode and the machine which is an expander in the first operating mode functions as a compressor in the second operating mode). Thus, it may be that the working fluid follows the same path, in opposite directions, between the same two working machines (one functioning as a compressor in the first operating mode and an expander in the second operating mode, and the other functioning as an expander in the first operating mode and a compressor in the second operating mode. Typically the compressor and expander have rotatable shafts which are coupled (for example are parts of the same shaft).

Typically, the working fluid circulation pathway has a high pressure side and a low pressure side. These typically correspond to high temperature sides and low temperature sides. That being said, it may be that the temperatures in the high pressure and low pressure sides are highly variable in time and along the length of the high and low pressure sides of the working fluid circulation pathway. For example, the temperature at opposite ends of a heat exchanger in the working fluid circulation pathway is typically very different. Typically first and second fluid working machines divide the working fluid circulation pathway into a high pressure side and a low pressure side. By this we refer to the relative pressure of the working fluid in the working fluid circulation pathway in use. Typically, the apparatus has a first heat exchanger (high temperature heat exchanger) located in the high pressure side of the working fluid circulation pathway and a second heat exchanger (low temperature heat exchanger) located in the low pressure side of the working fluid circulation pathway. By high and low temperature we refer to the relative pressure of the working fluid in the heat exchangers in use. The first and/or second heat exchanger may correspond to the above described heat exchanger. The high and/or low pressure sides of the working fluid circulation pathway may comprise at least one tank to store working fluid.

Typically, the apparatus comprises a first fluid working machine and a second fluid working machine, wherein in the first operating mode, the first fluid working machine functions as a compressor and the second fluid working machine functions as an expander and in the second operating mode, the first fluid working machine functions as an expander and the second fluid working machine functions as a compressor. Thus working fluid may flow in opposite directions around the working fluid circulation pathway, through the first and second fluid working machines, in the first and second operating modes. Typically the first and second fluid working machines have rotatable shafts which are coupled (for example are parts of the same shaft), and are also coupled to the prime mover and a power take off (which may optionally be the prime mover in the first operating mode and function as the power take off in the second operating mode, for example an electrical motor also operable as a generator).

The apparatus may comprise one or more electronically commutated fluid working machines having a low pressure manifold (connected to the low pressure side of the working fluid circulation pathway), a high pressure manifold (connected to the high pressure side of the working fluid circulation pathway), a rotatable shaft, and a plurality of working chambers of cyclically varying volume, each working chamber having an electronically controlled low pressure valve which regulates the flow of working fluid between the low pressure manifold and the working chamber and an electronically controlled high pressure valve which regulates the flow of working fluid between the high pressure manifold and the working chamber, wherein a controller controls the low and high pressure valves of the working chambers in phased relationship with cycle of working chamber volume (typically using a shaft position sensor) to determine the net displacement of working fluid by each working chamber on each cycle of working chamber volume. Typically, the controller controls the low and high pressure valves to cause each working chamber to undergo either an inactive cycle with no net displacement of working fluid or an active cycle with a net displacement of working fluid. Typically, the controller controls the low and high pressure valves to cause each working chamber to carry out either compressor cycles (which lead working fluid being received from the low pressure manifold and output at a higher pressure and temperature to the high pressure manifold) or expander cycles (which lead to working fluid being received from the high pressure manifold and output at a lower pressure and temperature to the low pressure manifold). It may be that the first and second fluid working machines are each such electronically commutated fluid working machines (typically with the working chambers of one fluid working machine carrying out compressor cycles, which may be interspersed with inactive cycles, while the working chambers of the other fluid working machine carry out expander cycles, which may be interspersed with inactive cycles) although it is also possible for the first and second fluid working machines to be formed by different groups of working chambers (with separate respective low and high pressure manifolds) within the same said electronically commutated fluid working machine, with one group of working chambers carrying out compressor cycles, which may be interspersed with inactive cycles, while the other group of working chambers carry out expander cycles, which may be interspersed with inactive cycles.

Such machines enable the rate of displacement of working fluid by the first and second fluid working machines (i.e. the compressor and expander) to be independently varied in order to independently control the pressure in the high pressure side of the working fluid circulation pathway (and typically also the pressure in the low pressure side of the working fluid circulation pathway) and also the rate of circulation of working fluid around the working fluid circulation pathway. The rate of displacement by the first and second fluid working machines may be regulated by varying the ratio of active to inactive cycles of working chamber volume.

However, it may be that there are at least three fluid working machines, wherein in the first operating mode the first fluid working machine functions as an expander and the second fluid working machine functions as a compressor and the working fluid flows from the output of the second machine to the input of the first machine through the heat exchanger in a first direction, and in the second operating mode the third fluid working machine functions as an expander and either the first fluid working machine or a fourth fluid working machine functions as the compressor and the working fluid flow from the output of the first or fourth fluid working machine to the input of the third fluid working machine through the heat exchanger in a second direction opposite to the first direction. The first, second, third and if present fourth fluid working machines typically have rotatable shafts which are coupled, for example they may be mounted to the same rotating shaft. The first, second, third and if present fourth fluid working machine may be turbomachines.

Typically, the thermal storage media is particulate. The thermal storage media may comprise or be formed as particles which may be spherical. The particles may have a diameter in range of 5 to 25 mm, for example 8 to 15 mm. The residency time of the thermal storage media within the heat exchange chamber may be in the range of 2 to 20 minutes, for example 3 to 8 minutes. These parameters have been found to give good results.

The thermal storage media may be glass, for example recycled glass, made from glass cullet, which is readily available at low cost. Glass is cheap, while being robust and having a good specific heat capacity.

The heat exchanger is also useful in other applications, for example to heat or cool a reaction fluid in a chemical manufacturing process. According to a third aspect of the invention there is provides a heat exchanger, the heat exchanger having a heat exchange chamber configured to bring thermal storage media into direct contact with a fluid to thereby exchange heat energy between the working fluid and the thermal storage media, wherein the fluid is typically a gas within the heat exchange chamber and wherein the thermal storage media is a solid, wherein the heat exchanger is configured to cause received thermal storage media to be moved into and out of (typically through) the heat exchange chamber, and wherein the heat exchanger is reversible to transfer heat energy from the fluid to the thermal storage media or vice versa in alternative first and second operating modes.

According to a fourth aspect of the invention there is provided a method of operating a heat exchanger, the method comprising the step of receiving thermal storage media into a heat exchange chamber of the heat exchanger, contacting the thermal storage media with typically gaseous working fluid within the heat exchange chamber, and then outputting the thermal storage media from the heat exchange chamber, wherein the heat exchanger is reversible to transfer heat energy from the fluid to the thermal storage media or vice versa in alternative first and second operating modes. Typically, in the first operating mode, the thermal storage media passes through the heat exchange chamber in a first direction and in the second operating mode the thermal storage media passes through the heat exchange chamber in the opposite direction.

The fluid may for example comprise reactants which are to undergo or which are undergoing a chemical reaction, which may for example by exothermic or endothermic. The fluid may be a working fluid.

Further optional features (e.g. of the heat exchanger, the thermal storage media etc.) correspond to those optional features discussed above in respect of the first and second aspects of the invention.

It is known to introduce thermal storage media which has been stored a first pressure (e.g. ambient) into a heat exchanger at a second (typically higher) pressure using a lockhopper, which is a device which dispenses a solid material, usually by the action of gravity, across a pressure differential, for example using an air lock arrangement. Similarly it is known to remove thermal storage media from a heat exchanger into a lower or higher temperature media store which is at a lower pressure than the heat exchanger for protracted storage using a lockhopper.

However, lockhoppers generally consume a significant amount of energy due to the pressurisation and depressurisation of working fluid, especially where the working fluid is a gas, at least in the heat exchanger.

In a fifth aspect of the invention there is provided a method of transferring thermal storage media from a media store to a heat exchange chamber, or vice versa, across a pressure differential, in an apparatus comprising a working fluid circulation pathway, the working fluid circulation pathway comprising a heat exchanger which comprises the heat exchange chamber.

Typically the heat exchange chamber is at a higher pressure than the media store (during operation).

Typically, the apparatus is a pumped heat energy storage apparatus. Typically, the thermal storage media is a solid. Typically, the working fluid is brought into direct contact with the thermal storage media as a gas in the heat exchange chamber and thereby transfers heat to or from the thermal storage material. Thus the heat exchanger is typically a direct contact heat exchanger (configured so that working fluid is brought into direct contact with the thermal storage media as a gas in a heat exchange chamber of the heat exchanger).

Typically, the method comprises receiving thermal storage media into at least one transfer chamber in the presence of gaseous working fluid. The apparatus comprises at least one transfer chamber and at least one working chamber which is fluidically connectable to the at least one transfer chamber.

The thermal storage media may be transferred into the at least one transfer chamber from a media store (where the thermal storage media is being loaded into the heat exchange chamber), or from the heat exchange chamber (where the thermal storage media is being unloaded from the heat exchange chamber). Thermal storage media are thereby transferred from a media store to the at least one transfer chamber and then to the heat exchange chamber (during loading) or from the heat exchange chamber to the at least one transfer chamber and to the media store (during unloading).

According to the method, at least one transfer chamber is fluidically connected to at least one working chamber of variable volume. The at least one transfer chamber may already be fluidically connected to at least one working chamber or there may be a step of connecting the at least one transfer chamber to at least one working chamber (for example by opening one or more valves).

The method further comprises the step of decreasing or increasing the volume of the at least one working chamber to thereby compress or expand working fluid in the at least one transfer chamber while the at least one transfer chamber is fluidically connected with at least one working chamber (and while thermal storage media remains in the at least one transfer chamber). Typically, the at least one working chamber does not contain thermal storage media during this step.

It is advantageous to use at least one working chamber which is not the at least one transfer chamber for the compression or expansion of working fluid in the at least one transfer chamber to avoid restrictions on compression or expansion due to the presence of thermal storage media in the at least one transfer chamber.

The method comprises recovering energy from the work done by working fluid on at least one working chamber while the working fluid expands.

In a sixth aspect there is provided pumped heat energy storage apparatus comprising a solid thermal storage media, a thermal media store, a heat exchanger having a heat exchange chamber, and a working fluid circulation pathway, the working fluid circulation pathway comprising the heat exchanger, the apparatus comprising at least one transfer chamber and at least one working chamber and configured to transfer thermal storage media from the media store to the at least one transfer chamber and then to the heat exchange chamber or from the heat exchange chamber to the at least one transfer chamber and then to the thermal media store, the apparatus configured to decrease or increase the volume of the at least one working chamber to thereby compress or expand working fluid in the at least one transfer chamber while the at least one transfer chamber is fluidically connected to the at least one working chamber, and to recover energy from the work done by on at least one working chamber while the working fluid is expanded. The apparatus may comprise a plurality of chambers of variable volume which are operable as a said transfer chamber or a said working chamber in alternative operating modes of the apparatus.

It may be that the energy is recovered from the said expansion of the working fluid in the at least one transfer chamber (while thermal storage media remains in the at least one transfer chamber). It may be that the method further comprises expanding working fluid (e.g. from the heat exchange chamber) and recovering energy from that expansion. The at least one working chamber on which work is done may the same or a different at least one working chamber to the at least one working chamber which is fluidically connected to the at least one transfer chamber to compressed or expand working fluid in the at least one transfer chamber.

Typically, energy from the expansion of working fluid (by either option) is recovered from the work done by the working fluid on at least one working chamber (which may be the same or a different at least one working chamber) while it expands.

It may be that thermal storage media is transferred into the at least one transfer chamber from a media store, the volume of the at least one working chamber is decreased to compress working fluid in the at least one transfer chamber and then the thermal storage media (and at least some of the compressed working fluid) is transferred from the at least one transfer chamber to the heat exchange chamber.

The at least one transfer chamber may already be fluidically connected to at least one working chamber or there may be a step of connecting the at least one transfer chamber to at least one working chamber (for example by opening one or more valves).

Typically the at least one working chamber is sealed from the at least one transfer chamber after the step of compressing the working fluid and before the step of transferring the thermal storage media and at least some of the compressed working fluid from the transfer chamber to the heat exchange chamber.

It may be that the thermal storage media is transferred into the at least one transfer chamber from the heat exchange chamber, the volume of the at least one working chamber increases and the working fluid in the at least one transfer chamber is expanded, and then the thermal storage media (and at least some of the expanded working fluid) is transferred to the heat exchange chamber.

The at least one transfer chamber may already be fluidically connected to at least one working chamber or there may be a step of connecting the at least one transfer chamber to at least one working chamber (for example by opening one or more valves).

Typically the at least one working chamber is sealed from the at least one transfer chamber after the step of expanding the working fluid and before the step of transferring the thermal storage media (and at least some of the compressed working fluid) from the transfer chamber to the media store.

Accordingly, some of the energy which is consumed in compressing working fluid is recovered from the expansion of working fluid. Typically, some of the energy which is consumed in compressing working fluid for introduction into the heat exchange chamber is recovered from the expansion of working fluid. Energy may be recovered by, for example, expanding working fluid received from the heat exchanger chamber or by expanding working fluid which has been compressed as part of the process of compressing working fluid but which has not yet been introduced into the heat exchange chamber. This improves overall energy efficiency. Furthermore, working fluid present with thermal storage media to be loaded into the heat exchange chamber is compressed and heated. This avoids an outflow of working fluid (and consequent loss of heat energy) from the heat exchange chamber when thermal storage media is loaded into the heat exchange chamber. Similarly, the transfer chamber into which storage media is received from the heat exchange chamber is pressurised to restrict an outflow of working fluid from the heat exchange chamber.

The pressure differential (between the media storage and the heat exchange chamber) is typically greater than 1 bar and it may be greater than 10 bar or greater than 100 bar. The higher the pressure differential the greater the benefit of the invention.

It may be that the media store is at ambient temperature. It may be that the media store is at ambient pressure. Typically, the media store comprises gaseous working fluid.

Typically gas present in the media store is gaseous working fluid. Typically, working fluid circulates around the working fluid circulation pathway and some is also transferred from the working fluid circulation pathway to the media store or vice versa.

The apparatus may comprise first and second media stores for retaining media at different temperatures, a base temperature (e.g. ambient temperature) and an energy storage temperature which is higher or lower than the base temperature. It may be that, during energy storage, thermal storage media is transferred from the first media store to the heat exchange chamber, heated in the heat exchange chamber from direct contact with working fluid, and then stored at a higher temperature than the base temperature in the second media store. It may be that, during energy retrieval, thermal storage media is received from the second media store at a temperature which is higher than base temperature and then used to heat working fluid in the heat exchange chamber by direct contract with working fluid, and then stored in the first media store at base temperature. For pumped heat energy storage system, these processes apply at the high pressure side of the apparatus. In this case, at the low pressure side, it may be that, during energy storage, thermal storage media is transferred from a third media store to the heat exchange chamber, cooled in a second heat exchange chamber from direct contact with working fluid, and then stored at a lower temperature than the base temperature in a fourth media store. It may be that, during energy retrieval, thermal storage media is received from the fourth media store at a temperature which is lower than base temperature and then used to cool working fluid in the heat exchange chamber by direct contract with working fluid, and then stored in the third media store at base temperature. Base temperature may vary with time, for example due to changes in ambient temperature and/or due to some variation during the energy storage and/or retrieval process. The higher and lower temperature may also change during energy storage and retrieval as energy is stored and/or retrieved.

Typically the heat exchanger has a heat exchange chamber configured to bring thermal storage media into direct contact with working fluid in the working fluid circulation pathway to thereby exchange heat energy between the working fluid and the thermal storage media. The working fluid may be a gas throughout the working fluid circulation pathway, although it is also possible that the working fluid undergoes phase changes in the working fluid circulation pathway, for example that it is a gas (e.g. supercritical gas) in the heat exchange chamber but a liquid in at least one region of the working fluid circulation pathway. Thus the apparatus may be pumped heat energy storage apparatus according to the first aspect of the invention and the method may be a method according to the second aspect of the invention. The heat exchanger may be a heat exchanger according to the third aspect of the invention. The method may comprise operating the heat exchanger by the method of the fourth aspect of the invention. Typically, in a first operating mode (e.g. energy storage) thermal storage media from passes through the heat exchange chamber in a first direction and in a second operating mode (e.g. energy recovery) thermal storage media passes through the heat exchange chamber in an opposite second direction. It may be that the in first operating mode thermal storage media passes from the first media store, through the heat exchange chamber in a first direction, to the second media store and in the second operating mode thermal storage media passes from the second media store, through the heat chamber in the opposite second direction.

During loading, the thermal storage media is transferred from a media store into the heat exchange chamber via the at least one transfer chamber. Typically the pressure in the heat exchange chamber is greater than the pressure in the media store. It may be that the pressure in the heat exchange chamber is at least 10 times the pressure in the media store. It may be that the pressure in the media store is less than 2 bar, for example it may be atmospheric pressure. It may be that the pressure in the heat exchange chamber is at least 10 bar or at least 25 bar or at least 100 bar. It may be that the pressure in the heat exchange chamber is in the range of 5 to 25 bar (for example in the case of the heat exchange chamber on the low pressure side) or in the range of 50 to 250 bar (for example in the case of the heat exchange chamber on the high pressure side).

In this case, the volume of the at least one working chamber is reduced to compress working fluid in the at least one transfer chamber. Thermal storage media and compressed working fluid are then transferred into the heat exchange chamber.

Typically, the at least one transfer chamber is located above the end of the heat exchange chamber into which thermal storage media is to be introduced. Thus, the transfer of thermal storage media into the heat exchanger can be gravity-fed.

It may be that after thermal storage media is transferred into the at least one transfer chamber, at least one transfer chamber is connected to the at least one working chamber and pressurised working fluid in the at least one working chamber passes into the at least one transfer chamber and increases the pressure of working fluid in the at least one transfer chamber. This process is typically isenthalpic free expansion.

Typically, the said pressurised working fluid in the at least one working chamber was previously received into the at least one working chamber from the heat exchange chamber. Typically it was previously received while the at least one transfer chamber was connected to the heat exchange chamber. Typically it was previously received within one cycle of a loading or unloading a batch of storage media into our out of the heat exchange chamber. As a result, pressurised gas received from the heat exchange chamber is used subsequently to partially pressurise the at least one transfer chamber while it retains thermal storage media. This reduces the amount of energy which is used in the mechanical compression of working fluid.

It may be that when the volume of the at least one working chamber is reduced, the pressure in the at least one transfer chamber (and the at least one working chamber) is increased to at least, or typically above the pressure in the heat exchange chamber (at the location where the thermal storage media is to be introduced). This minimises energy loss when the contents of the at least one transfer chamber are transferred into the heat exchange chamber.

It may be that after the step of compressing the working fluid in the at least one transfer chamber, the at least one transfer chamber and typically also the at least one working chamber are connected to the heat exchange chamber and working fluid is allowed to circulate therebetween.

It may be that the volume of the at least one transfer chamber is reduced to displace thermal storage media therein into the heat exchange chamber (for example by the movement of a piston). Typically, while thermal storage media is displaced into the heat exchange chamber, the volume of the at least one working chamber increases and there is a net flow of working fluid from the heat exchange chamber into the at least one working chamber. Thus, as working fluid is introduced into the heat exchange chamber along with the thermal storage media, pressurised working fluid is displaced into the at least one working chamber, where it can be used to recover energy.

Typically the method comprises disconnecting the at least one working chamber from the heat exchange chamber and then expanding the working fluid remaining within the at least one working chamber. Typically energy is recovered from this expansion (from the work done by the working fluid on the at least one working chamber (e.g. on a piston)).

During unloading, the thermal storage media is transferred to a media store from the heat exchange chamber via the at least one transfer chamber. Typically the pressure in the heat exchange chamber is greater than the pressure in the media store.

In this case, the volume of the at least one working chamber is increased to expand working fluid in the at least one transfer chamber. Thus working fluid received (typically with thermal storage media) from the heat exchanger is used to recover energy by work done in expanding the at least one working chamber. Typically this takes place with the at least one working chamber connected to the at least one transfer chamber but not to the heat exchanger. After this step, the thermal storage media and expanded working fluid are typically transferred to the media store.

Thus the method typically includes the step of receiving the thermal storage media into the at least one transfer chamber from the heat exchange chamber. Typically, the at least one transfer chamber is located below the end of the heat exchange chamber from where thermal storage media is received. Thus, the transfer of thermal storage media from the heat exchange chamber into the at least one thermal transfer chamber can be gravity fed.

It may be that when thermal storage media is transferred from the heat exchange chamber into the at least one transfer chamber, along with working fluid, pressurised (and typically heated) working fluid in the at least one working chamber is transferred into the heat exchange chamber. This reduces or avoids a loss of pressurised working fluid from the heat exchange chamber. The method may comprise the step of at the at least one working chamber decreasing in volume and compressing working fluid (typically while the at least one working chamber is sealed). Thus the at least one working chamber has pressurised working fluid to transfer to the heat exchange chamber. Typically, at least one working chamber is sealed after the step of expanding working fluid in the at least one transfer chamber. Thus, some of the energy stored in the pressurisation and heat energy of working fluid received from the heat exchange chamber with the thermal storage media can be retained, reducing the energy required by the at least one working chamber to pressure working fluid for transfer into the heat exchange chamber.

Typically thermal storage media in the at least one transfer chamber is then transferred to the thermal media store. The thermal storage media may fall out of the at least one transfer chamber, for example through a port which is exposed when a piston within the at least one transfer chamber is at the lowest end of its travel. Typically the thermal storage media is raised by a conveyor (e.g. an auger) to the thermal media store (which is typically higher than the heat exchange chamber), typically from below the heat exchange chamber.

It may be that working fluid is pressurised and introduced into the heat exchange chamber periodically and/or continuously. This maintains the mass of working fluid circulating in the working fluid circulation pathway. The pressure and/or rate of introduction may be varied to achieve a fixed or variable target mass of working fluid in the working fluid circulation pathway.

It may be that the method comprises the step of displacing working fluid (typically at a low pressure, e.g. ambient) from the at least one transfer chamber to the media store (by reducing the volume of the at least one transfer chamber). The heat exchanger chamber, at least one transfer chamber and at least one working chamber may then be sealed from each other. The unloading cycle may then repeat.

At least one transfer chamber may be located above the heat exchange chamber and the apparatus may further comprises a valve which when actuated allows thermal storage media within the at least one transfer chamber to fall into the heat exchange chamber by gravity. The said at least one transfer chamber may comprise a piston cylinder in which the piston moves downward to reduce the volume of the chamber and upward to increase the volume of the chamber. The at least one transfer chamber may be configured to receive thermal storage media when the piston is above a threshold position in the cylinder.

At least one transfer chamber may be located below the heat exchange chamber and comprises a valve which when actuated allows thermal storage media within the heat exchange chamber to fall into the at least one transfer chamber by gravity. The at least one said transfer chamber may comprise a piston cylinder in which the piston moves upward to reduce the volume of the chamber and downward to increase the volume of the chamber. Thus the piston may be moved downward to cause thermal storage media within the heat exchanger chamber to fall into the at least one transfer chamber.

At least one transfer chamber may comprise an outlet, which is typically openable by a piston sliding within a cylinder, through which thermal storage media may fall out of the at least one transfer chamber by gravity. A thermal storage media conveyor may be arranged to lift thermal storage media which has passed out of a said outlet to a media store.

It may be that one or more chamber is operable (or is operated) as a said transfer chamber or a said working chamber in alternative operating configurations. This reduces the total number of chambers which are required. The at least one transfer chamber and the at least one working chamber (and the one or more chamber is which is operable, or operated as a said transfer chamber or a said working chamber) may each be piston cylinders.

It may be that at a first end of the heat exchange chamber a first chamber is located above the heat exchange chamber for transferring thermal storage media from a media store into the heat exchange chamber and a second chamber is located below the heat exchange chamber for transferring thermal storage media from the heat exchange chamber into a media store (which may be the same or a different media store). Advantageously the first and second chambers may therefore each displace thermal storage media into or out of the heat exchange chamber using gravity.

It may be that in a first operating mode, the first chamber is operable as a said transfer chamber and the second chamber is operable as a said working chamber and in a second operating mode, the first chamber is operable as a said working chamber and the second chamber is operable as a said transfer chamber. Typically, thermal storage media is either being loaded into or unloaded from the heat exchange chamber at one end of heat exchange chamber (typically, while being unloaded or loaded respectively at the other end of the heat exchange chamber) and so this enables one or more chambers which are not currently required to transfer thermal storage media to be used as the one or more working chambers.

The at least one transfer chamber, or at least one chamber which is operable as a said transfer chamber or a working chamber, is typically at least one piston cylinder unit (comprising a cylinder and a piston slidably mounted in the cylinder). Energy may be input during the compression step by driving the piston (as the volume of the at least one transfer chamber decreases), for example using one or more hydraulic (or pneumatic) or electrical actuator, or via one or more cam fitted to a rotating shaft. Thus the apparatus may comprise an actuator to input energy during the compression step by driving the piston (to compress the working fluid). Energy may be recovered during the expansion step from the work done on the piston (as the volume of the at least one transfer chamber increases), for example by the compression of hydraulic (or pneumatic) fluid in a hydraulic (or pneumatic) actuator, recovery of electrical power in an electrical actuator, or by work done on a cam fitted to a rotating shaft. Thus the apparatus may comprise a generator, integral with or separate to the actuator, to recover energy from the work done on the piston by expanding working fluid as the volume of the at least one transfer chamber increases.

The working chamber drive mechanism may comprise a hydraulic or pneumatic actuator, for example a hydraulic pump. The working chamber drive mechanism may comprise an electrical motor, which may be operable as an electrical generator in an alternative operating mode. The working chamber drive mechanism may comprise a rotatable shaft (which rotates in use) the rotation of which is coupled to cycles of working chamber volume, for example using a cam. The working chamber drive mechanism may comprise one or more energy storage and return mechanisms, for example one or more elastic bodies or gas accumulators. Such a mechanism may store energy received from the expansion of working fluid and use it in part to compress working fluid, typically within the same cycle of expansion and compression.

Although the at least one working chamber used to compress working fluid is typically the same as the at least one working chamber used to expand working fluid this is not essential and different one or more working chambers may be used for these steps.

In some embodiments, the thermal storage media is stored in a media store other than in the presence of working fluid (for example atmospheric air) and so for the thermal storage media to be introduced into a heat exchanger it must be brought into contact with working fluid. This risks diluting working fluid in the heat exchanger (for example with atmospheric air). Similarly, when the thermal storage media is removed from the heat exchanger for storage in the presence of a fluid other than working fluid (for example atmospheric air), working fluid can be lost from the heat exchanger. These issues apply in addition to the loss of energy which can be caused by introducing fluid below the temperature of working fluid into the heat exchanger, or the loss of energy from loss of working fluid pressure. The typically substantial pressure difference between media store and heat exchanger makes it more difficult to resolve these problems.

In particular, if the working fluid is a gas and the thermal storage media is a solid material which is stored in the presence of a gas other than working fluid (for example, atmospheric air) then working fluid is lost with the thermal storage media as it is stored, after heat exchange. Even if the working fluid is later reclaimed, it will have lost heat energy or pressure.

In some cases, particularly where the thermal storage media are to be stored in the media stores in a gas other than the working fluid (for example to be stored in atmospheric air), it is especially important to separate out and retain working fluid which would otherwise be lost with the thermal storage media when the storage media is removed from the heat exchanger.

Accordingly, in a seventh aspect of the invention there is provided a method of exchanging heat between a working fluid of a pumped heat energy storage apparatus and a thermal storage media, the apparatus comprising a working fluid circulation pathway, wherein the thermal storage media is a solid, and wherein the working fluid is brought into direct contact with the thermal storage media, typically as a gas, and thereby transfers heat to or from the thermal storage material, wherein the method comprises separating the thermal storage media which has been brought into direct contact with the gas, from the gas, and storing the separated thermal storage media, while retaining and reusing the separated gas as working fluid within the working fluid circulation pathway.

In an eighth aspect of the invention there is provided a pumped heat energy storage apparatus comprising a heat exchanger having a heat exchange chamber in fluid communication with a working fluid circulation pathway, and thermal storage media, wherein the thermal storage media is a solid, the heat exchanger configured to bring working fluid in the working fluid circulation pathway, typically as a gas, into direct contact with the thermal storage media, to thereby transfers heat to or from the thermal storage material, and to separate the thermal storage media which has been brought into direct contact with the gas, from the gas, and which has a first outlet for the separated thermal storage media and a second outlet for the separated gas. The second outlet is typically connected to the working fluid circulation pathway to retain working fluid within the working fluid circulation pathway.

As before, the working fluid is typically a gas within the heat exchange chamber and typically contacts the thermal storage media as a gas. It is possible that the working fluid remains a gas in operation or that the working fluid, which is a gas where it is brought into contact with the thermal storage media, may circulate around a working fluid circulation pathway and be a liquid in at least part of the working fluid circulation pathway. In some embodiments, the working fluid is a liquid in the heat exchanger.

Typically the method also comprises receiving the thermal storage media along with gas (typically within which the thermal storage media has been stored), and separating the received gas from the thermal storage media, prior to bringing the thermal storage media into direct contact with the working fluid, while restricting the ingress of received gas into the working fluid circulation pathway. Said received gas may be returned to a container for thermal storage media, such as the container from which the thermal storage media was received.

The working fluid is typically circulated around a working fluid circulation pathway, where it is compressed and thereby heated, brought into direct contact with a thermal storage material (typically within a heat exchange chamber of a heat exchanger), expanded and thereby cooled, and brought into direct contact with a cold storage material, in a cycle. Thus, the working fluid is typically retained with the working fluid circulation pathway.

The working fluid is typically maintained under pressure during the steps of bringing the working fluid into direct contact with the thermal storage media, and separation of the working fluid from the thermal storage media, and bringing the working fluid to an inlet of a compressor or expander.

Thermal storage media can therefore be stored while minimising or avoiding loss of working fluid from the working fluid circulation pathway, which is typically closed. Thus, the method seeks to minimise loss of working fluid and in particular loss of heat (or cold) and pressure of working fluid as the thermal storage media is stored. Ingress of gas into the working fluid circulation pathway with the thermal storage media is typically also avoided.

Typically, the method comprises the step of displacing the gas (e.g. received gas or working fluid) from the thermal storage media with a liquid. Liquids are much less compressible than gases. They can displace gas and thereby enable gas which is in contact with the thermal storage media to be separated from the thermal storage media.

The method may comprise containing a portion of thermal storage media within a volume and introducing the liquid to the volume (typically filing the volume with the liquid) while providing a path for the gas to leave the volume. The method may comprise causing a portion of thermal storage media to enter (e.g. be lowered or fall into) a volume which contains the liquid.

The method may comprise the step of separating the liquid from the thermal storage media. The liquid may fall from the thermal storage media by gravity. The liquid is typically reused. The liquid is typically maintained at a similar temperature to the working fluid. The liquid may be urged into contact with the thermal storage media using pressure from working fluid in the working fluid circulation pathway. For example, liquid may be contained within a chamber which also contains working fluid from (typically in gaseous communication with) the working fluid circulation pathway, either without separation or with a moveable (typically flexible) barrier therebetween.

The method may comprise outputting the thermal storage media which has been in contact with the working fluid at a different pressure to the pressure of the working fluid, typically a pressure which is less than 10% or even less than 1% of the pressure of the working fluid. For example, the working fluid may have a pressure of >100 bar (for example around 200 bar) and the thermal storage media may be output, typically to a container, at below 2 bar, for example at ambient pressure. The pressure of working fluid in the working fluid circulation pathway may be different to the pressure at which the thermal storage media is stored in a container after and/or before direct contact with the working fluid (typically in a heat exchanger), for example with a pressure difference of at least 10 bar or at least 100 bar, or a factor of at least 2, or at least 10, for example.

The method may comprise receiving storage media at a pressure which is a different pressure to the pressure of working fluid which is brought into direct contact with the thermal storage media, typically a pressure which is greater than 10 times, or even greater than 100 times the pressure of the working fluid. For example, the thermal storage media may be received (e.g. from a container) at a pressure of >100 bar (for example around 200 bar) and the working fluid may have a pressure of less than 2 bar, for example, ambient pressure, or below ambient pressure (on the cold side of the working fluid circulation pathway).

Thus, the method typical involves bringing thermal storage media into and/or out of the working fluid circulation pathway across a pressure differential and while maintaining a gas seal.

It may be that the method comprises receiving pressurised working fluid from a compressor and bringing the pressurised working fluid into direct contact with the thermal storage media and separating the thermal storage media from the pressurised working fluid while maintaining the pressure of the working fluid and while outputting the separated thermal storage media to a lower pressure, for example ambient pressure.

Typically, the thermal storage media is particulate and the method comprises transporting a portion of the thermal storage media from a media store where gas is present to a heat exchanger, or from a heat exchanger where working fluid is present to a media store, and concomitantly using the liquid to displace the gas received with the thermal storage media.

The step of transportation may include the step of using a rotary machine, having one or more chambers, or a piston cylinder machine having one or more cylinders. The rotary or piston cylinder machine may at the same time transport a portion of thermal storage media from a media store to a heat exchanger for heat exchange and at the same time transport a portion of thermal storage media from the heat exchanger, after heat exchange. The rotary or piston cylinder machine may comprise one or more inlet ports through which liquid is introduced into a chamber, or cylinder, and one or more outlet ports through which the gas is displaced out of the chamber, or cylinder.

It may be that the temperature of the liquid is regulated prior to the liquid being brought into contact with the thermal storage media to displace the gas. For example it may be heated (in the case of the high temperature heat exchanger) or cooled (in the case of the low temperature heat exchanger).

Typically, temperature regulation means are provided to maintain the liquid at a similar temperature to the thermal storage media. The temperature regulation means may comprise a further heat exchanger (in thermal communication with the heat exchanger or a conduit conveying the thermal storage media) or a heater (e.g. an electric heater) (for the high pressure side) or a cooling element (e.g. a peltier pump) (for the low pressure side).

The temperature regulation means may be configured to vary the temperature of the liquid as the temperature of the thermal storage media changes.

The liquid may be an ionic liquid. There are a number of ionic liquids which can tolerate temperatures of >300° C., for example 1 Ethyl 3 methylimidazolium bis (trifluoromethylsuflonyl)imide (EMIM TF SI). Liquids with different compositions may be used at the high pressure and low pressure sides of the working fluid circulation pathway.

Nevertheless, the maximum operating temperature of the liquid used in the air lock (on the high pressure side) can be a limiting factor as the liquid may otherwise degrade. Accordingly, it may be that temperature of the liquid is raised before the liquid is brought into contact with the thermal storage media, optionally wherein the temperature of the liquid is reduced again after the liquid has been separated from the thermal storage medium (in the case of the high temperature heat exchanger). It may be that temperature of the liquid is reduced before the liquid is brought into contact with the thermal storage media, optionally wherein the temperature of the liquid is raised again after the liquid has been separated from the thermal storage medium (in the case of the low temperature heat exchanger). The temperature regulation means may be configured to heat the liquid (e.g. a flow of liquid) before it is brought into contact with the thermal storage media to displace the gas and then to cool the liquid after it is has been introduced to the thermal storage media. It may comprise a heat exchanger configured to exchange heat between liquid (e.g. a flow of liquid) before and after it is brought into contact with the thermal storage media to displace the gas. It The liquid may comprise, or essential comprise, a liquid polysiloxane (a silicone fluid), for example Syltherm 800. (Syltherm is a trade mark of Dow Corning Corporation).

DESCRIPTION OF THE DRAWINGS

An example embodiment of the present invention will now be illustrated with reference to the following Figures in which:

FIGS. 10A, 10B, 10C, 10D, 10E are schematic diagrams of the heat exchanger, transfer chamber and working chamber at each of stages A, B, C, D and E of a process for loading thermal storage media into a heat exchanger of a pumped heat energy storage apparatus;

FIGS. 11A, 11B, 11C, 11D, 11E, 11F are schematic diagrams of the heat exchanger, transfer chamber and working chamber during each of stages A, B, C, D, E and F of a process for unloading thermal storage media into a heat exchanger of a pumped heat energy storage apparatus.

DETAILED DESCRIPTION OF AN EXAMPLE EMBODIMENT

Figure 1:
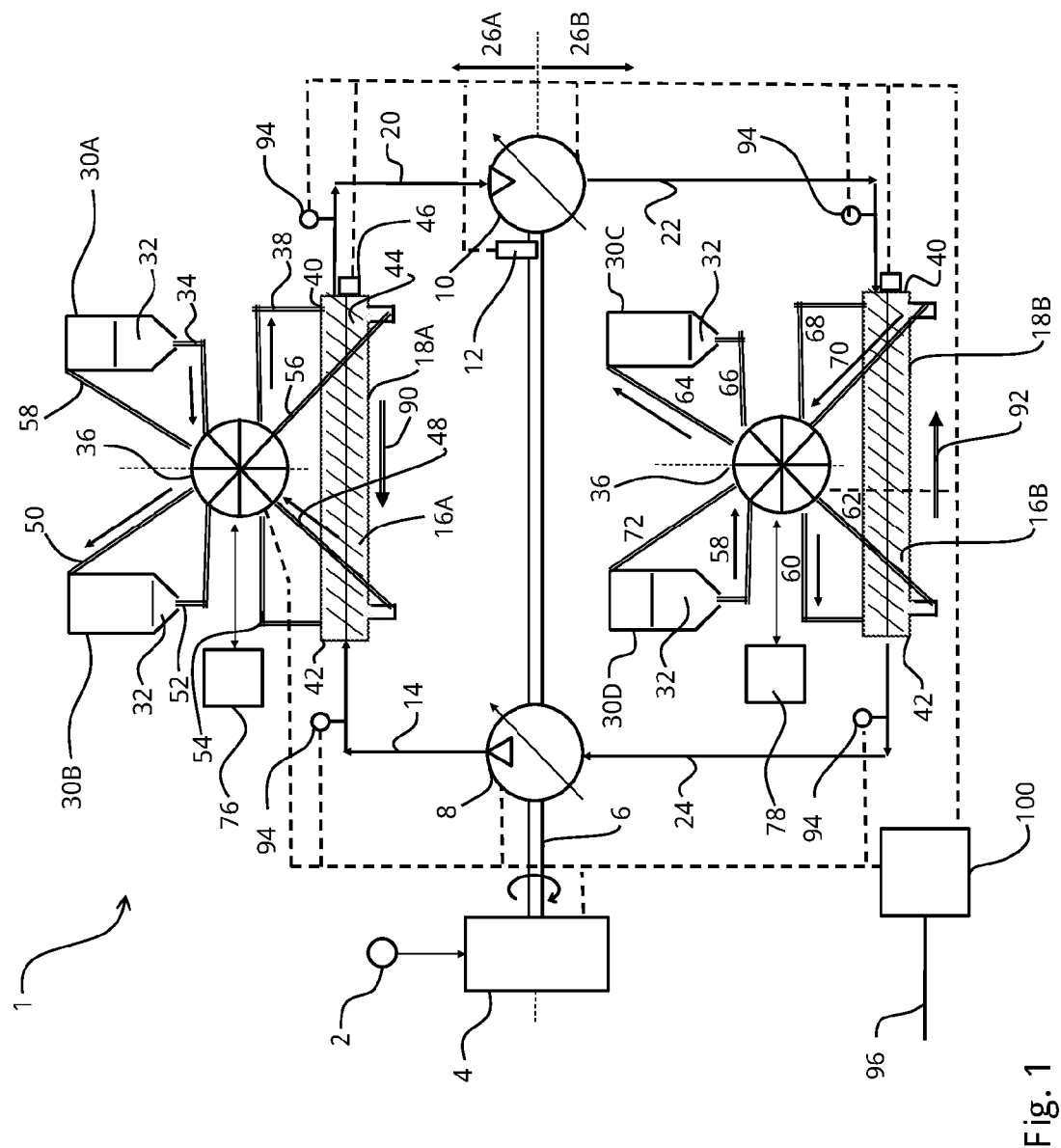
FIG. 1 is a schematic diagram of pumped heat energy storage apparatus, labelled to show operation during energy storage.

A pumped heat energy storage installation 1 will now be described with reference to FIGS. 1 and 2 which are labelled to show operation in an energy storage mode, in which electrical energy from an electrical interface 2 is stored as thermal energy (glass beads, functioning as the thermal storage media, are heated from ambient temperature while other glass beads, also functioning as thermal storage media, are cooled from ambient temperature), and in an alternative energy recovery (energy generation) mode in which thermal energy is used to generate electrical energy and return that to the electrical interface (while the glass beads are returned to ambient temperature).

The electrical interface 2 connects the apparatus to an electrical network, which may be an electrical grid, such as nationwide AC electrical grid, but the invention is also useful with standalone AC or DC electric grids and networks. The interface is connected to an electrical motor 4 which in this example is reversible to function as an electrical generator, although a separate electrical generator may instead be provided. The electrical motor drives a rotatable shaft 6, which rotates in use, and which drives the working chambers (e.g. cylinders) of first and second fluid working machines 8, 10, which are capable of operating as compressors or expanders in alternative operating modes. Although the compressors and expanders are reversible to swap whether they compress or expand working fluid and to reverse the direction of flow of working fluid, the reverse takes place during operation with the rotatable shaft rotating continuously in a single direction. This facilitates a rapid switch between energy storage and recovery. A shaft position sensor 12 monitors the position and speed of rotation of the rotatable shaft in use.

The working fluid is a gas, in this example argon. There is a closed loop working fluid circulation pathway 8, 14, 16A, 20, 10, 22, 16B, 24, 8 which has a high pressure side 26A, and a low pressure side 26B. By low pressure and high pressure, we refer to the relative pressures of working fluid during operation. The low pressure side can also be seen as a low temperature side and the high pressure side can also be seen as a high temperature side, although the temperatures can vary substantially within each side, across the heat exchangers described below.

In more detail, the working fluid circulation pathway extends from the high pressure side of the first fluid working machine through a high pressure conduit 14 and through a heat exchange chamber 16A of a high pressure side heat exchanger 18A (high temperature heat exchanger) and then to the high pressure side of the second fluid working machine 10 through a second high pressure conduit 20. The pathway continues from the low pressure side of the second fluid working machine through a low pressure conduit 22 through a heat exchange chamber 16B of a low pressure side heat exchanger 22B (low temperature heat exchanger) and then to the low temperature side of the first fluid working machine 8 through a further low pressure conduit 24. The arrows on the conduits 14, 20, 22, 24 show the direction of flow of working fluid during energy storage, in FIG. 1, and FIG. 2 shows the direction of flow during energy reclamation.

In addition to the working fluid circulation pathway, the apparatus further comprises high temperature and low temperature side thermal storage media paths. In this example the thermal storage media paths are generally in the form of figure of eight paths, with movement of thermal storage media through the heat exchangers in one direction during energy storage and the other direction during energy recovery.

Hoppers 30A and 30B are connected in a circuit extending through the high pressure side heat exchanger 18A and hoppers 30C and 30D are connected in a circuit extending through the low pressure side heat exchanger. The thermal storage media paths retains solid thermal storage media. In this example, the thermal storage media take the form of glass beads, which can be made economically from recycled glass. In this example, the beads are all the same size as each other, with a diameter in the range of about 10-12 mm. The hoppers are typically at atmospheric pressure. Hopper 30A stores ambient temperature beads; hopper 30B stores high temperature beads; hopper 30C stores ambient temperature beads and hopper 30D stores low temperature beads, in each case as and when required.

On the high pressure side, beads 32 are retained in hopper 30A at ambient temperature and pressure. When required during energy storage ambient temperature beads pass out of the hopper 30A, through conduit 34, through an air lock 36 which will be described further below, and through a further conduit 38 into a first end 40 of the high temperature heat exchanger 18A.

Figure 4:
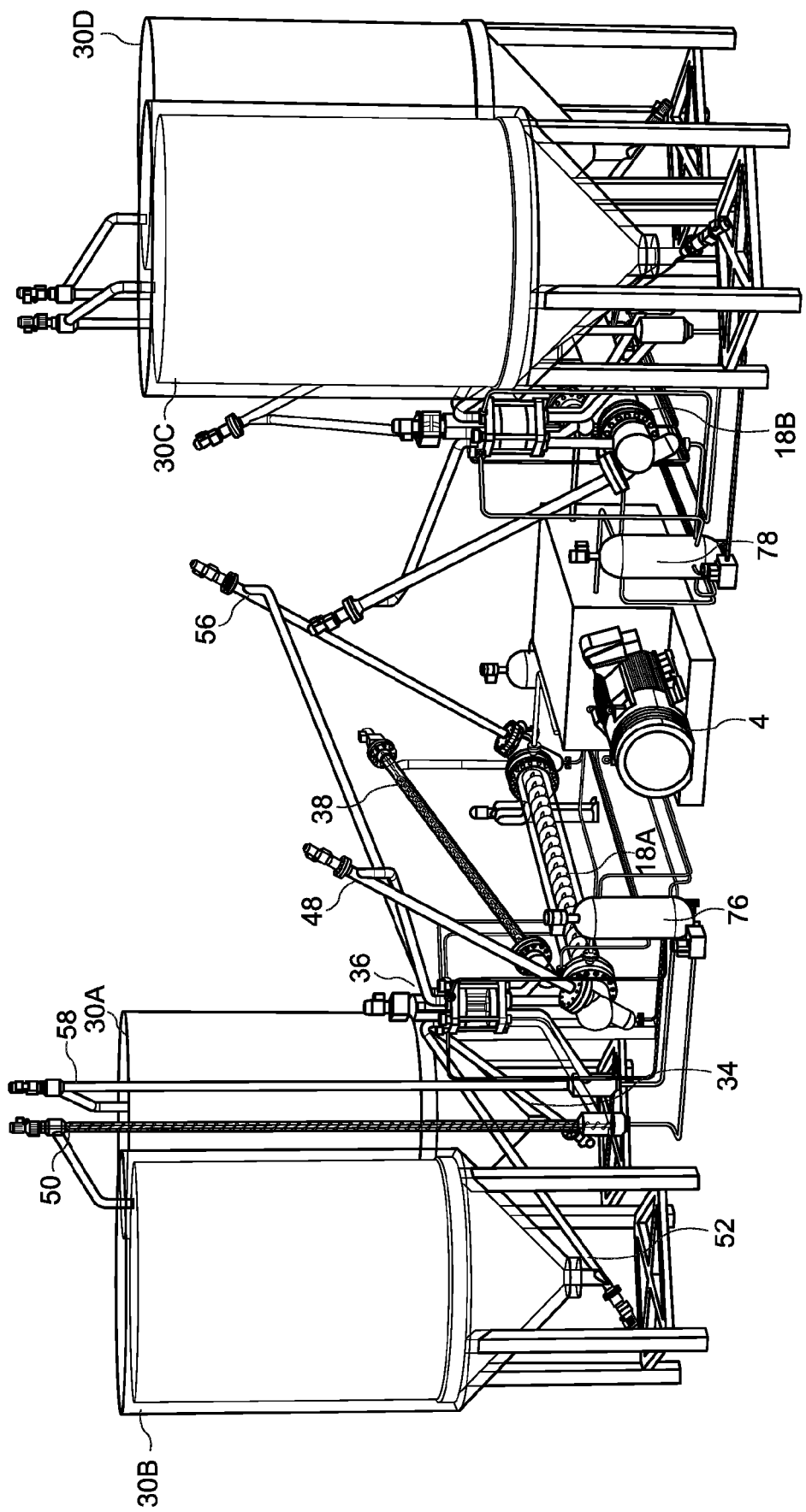
FIG. 4 is an isometric view of pumped heat energy storage apparatus.

Beads are moveable from the first end 40 of the heat exchanger 18A to the opposite second end 42 by the action of an auger 44 powered by a motor 46. Movement of beads from hopper 30A to the first end of the heat exchanger may be entirely under the influence of gravity although, as illustrated in FIG. 4, conduits with augers to lift beads are generally employed. Beads may also be urged around their path by a rotary actuator within the air lock. Each heat exchanger is horizontal and movement of the beads through the heat exchange chamber is obtained by the rotation of the auger. At the second end 42 of the high temperature heat exchanger 18A, beads which have passed through the heat exchanger can be lifted through a further conduit 48 (which will typically require a lift, in this example an auger) back to a separate portion of the air lock and then lifted further through another conduit 50 (again typically including an auger) to the top of high temperature hopper 30B within which they can be accumulated during energy storage.

The high pressure thermal storage media path continues from the high temperature hopper 30B. When required during energy recovery, high temperature beads pass out of the high temperature hopper 30B, through conduit 52 back to the air lock 36, and through a further conduit 54 to the second end 42 of the high temperature heat exchanger 18A. Beads can be conveyed to the first end of the high temperature heat exchanger by the auger 44 being rotated in the opposite direction and again there is a conduit 56 to convey beads from the first end of the high temperature heat exchanger to the air lock and a further conduit 58 to conveys beads from the air lock to the top of the ambient temperature hopper 30A. These conduits typically include augers to raise the beads. However, other kinds of conveyor may be employed, for example chain conveyors which include plates (e.g. mushroom shaped bodies) which are pulled through a tube to convey the thermal storage media. Such conveyors may apply less stress to beads and/or enable them to be raised vertically.

Although, in the Figures, beads pass out of the base of hopper 30B (and the other hoppers discussed below), alternative arrangements may be employed, for example beads may be swept or sucked from the top of the body of beads within the hoppers using a robotic actuator, a suction device which floats on top of the beads etc.

Tanks 76, 78 store a liquid which is circulated through the air lock via conduits and which serves to displace gas from the beads as will be described below. The liquid may be stored in a tank with working fluid gas from the working fluid circuit (either in the same volume or separated, for example by a flexible membrane) to provide pressure to urge the liquid into the air lock.

The low pressure side generally corresponds. Ambient temperature heat exchanger 30D retains further glass beads 32. During energy storage they are moved along a path through conduit 58 to a further air lock 36, having a further liquid supply 78, and then through conduit 60 to the second end 42 of low temperature heat exchanger 18B which generally corresponds in form to the high temperature heat exchanger and has a further auger 44 and motor 46. The path extends from the second end 40 of the heat exchanger through conduit 70 back to the air lock and through conduit 64 to the top of low temperature hopper 30C where cooled beads are stored. During energy recovery, the cooled beads are brought to the air lock through conduit 66 and from the air lock to the first end of the low temperature heat exchanger through conduit 68. They are moved from the second end of the low temperature heat exchanger to the air lock through conduit 62 and from there they are conveyed to the top of the ambient temperature hopper 30D through conduit 72. The conduits contain augers where required to lift the beads.

Figure 3:
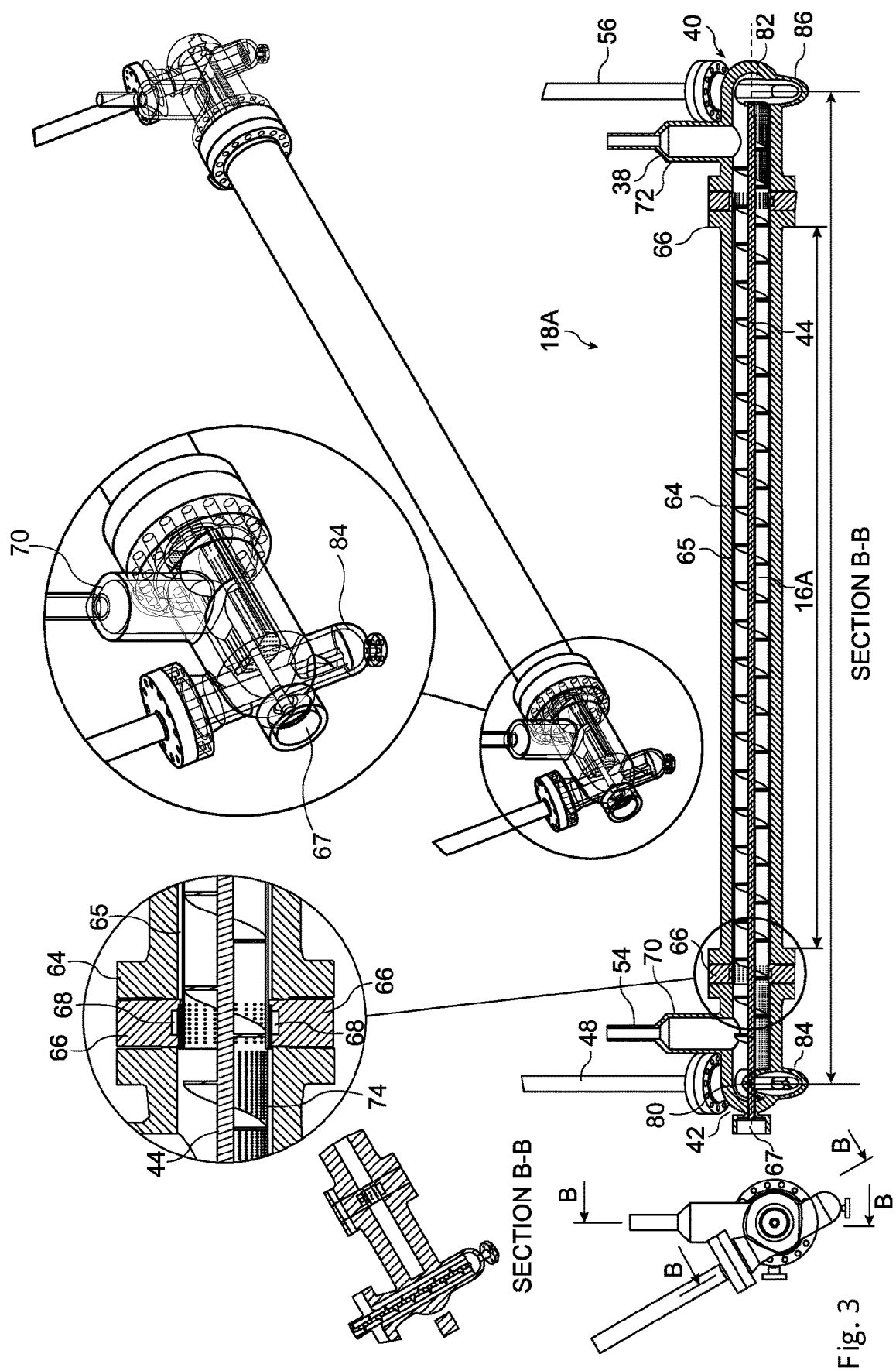
FIG. 3 is a cross sectional view and isometric view of a heat exchanger.

With reference to FIG. 3, in more detail, heat exchanger 18A has an exterior tube 64 retaining a liner tube 65 which defines an internal heat exchange chamber 16A containing the auger 14 which extends through the wall of the heat exchanger to a bellhousing and coupling 67 where it connects to motor 20.

At each end of the heat exchanger there is a gas injection and scavenging gallery, 66, which connects to working fluid conduits 14 (at the second end of the heat exchanger) and 20 (at the first end of the heat exchanger), and so functions as a port to introduce working fluid into and remove working fluid from the heat exchange chamber, in each case through a gas diffuser 68 fitted around the periphery of the heat exchange chamber wall.

Beyond each gas injection and scavenging gallery is an arrangement to introduce beads into and remove beads from the heat exchanger. At each end of the heat exchanger, there is a bead inlet buffer 68, 70, which serves to store beads received from the hoppers 30B, 30A through conduits 54, 38 respectively in the case of the high temperature heat exchanger (and from hoppers 30C, 30D through conduits 68, 60 respectively in the case of the low temperature heat exchanger). The buffer extends to above the height of the heat exchange chamber so that the auger (which extends beyond the bead inlet buffers at either side) will draw in beads using the full height of the heat exchange chamber. Underneath each bead inlet buffer the exterior tube 64 retains a peripheral liquid filter 74 through which any liquid from the air lock mechanism that is received with the beads drains and is recirculated to tanks 76, 78 for reuse. Outside of the bead inlet buffers there are weirs 80, 82, which serve to retain beads up to a predetermined height beyond around pits 84, 86 from where conduits 48, 56 extend, in the case of the high pressure heat exchanger and conduits 62, 70 in the case of the low temperature heat exchanger. The conduits extending from the pits require to raise beads and so include augers.

Accordingly, the heat exchangers may be operated with working fluid flowing in either direction, depending on the direction of operating (compression or expansion) of the fluid working machines and the beads moving in either direction, depending on the direction of movement of the heat exchanger auger. In use, the working fluid and beads are moved in opposite directions (contraflow). There is therefore direct contact between the working fluid and the beads. The size of the beads has been selected taking into account a number of factors:

to maximise their efficiency in thermal energy storage;
  to achieve a suitably high surface area to volume ratio to facilitate heat transfer;

to provide sufficient flow resistance to the working fluid as to create even flow and sufficient residence time to enable heat transfer to the core of the beads;

to avoid large voids which effectively short circuit gas flow;

to leave interstitial spaces which are sufficiently small in volume as to cause flow velocity to increase adjacent the surface of the beads, enhancing heat transfer.

The air locks address the issue that the heat exchangers can become highly pressurised in use, for example to 200 bar, whereas the hoppers are at much lower pressure and in this example at ambient pressure, 1 bar, and so it is necessary to convey the beads across substantial pressure differences. The hoppers therefore have to function as lockhoppers. In the present apparatus, the beads are received into chambers of rotary air locks 36. Where they are received from the hoppers, they are surrounded by the gas in which the beads are stored (typically ambient air, or argon) and as the air lock rotates, each chamber becomes sealed, including both beads and gas. Where they are received from the heat exchanger, they are surrounded by pressurised working fluid gas. Again, as the air lock rotates, each chamber becomes sealed, including both beads and gas. Liquid is then injected into the chambers through a port to displace the gas through an outlet. The port and outlet are located in a wall of the air lock such as to be in communication with the chambers only after they have been sealed from the inlet for beads and to be closed again before the chamber opens for the beads to flow out of the air lock. This arrangement works because liquids displace gases and are much less compressible. Where the gas is air received from the hopper, it may be allowed to pass into the atmosphere. Where beads are received from the working chamber, the gas is pressurised and temperature conditioned (hot on the high pressure side and cold on the low pressure side) and the displaced gas is returned from the relevant outlet to the working fluid circulation pathway on the high pressure or low pressure side as appropriate. This has the effect that the working fluid can directly contact and flow through the thermal storage media but neither the working fluid, nor to a large extent the energy stored in the pressure and temperature of the working fluid, are retained. In the arrangement shown in FIGS. 1 and 2, the chambers of the rotary air locks 36 will have beads at very different temperatures on either side (the sides are shown with a dashed line). They should therefore be designed to remain sealed despite thermal expansion and contraction, for example they may use cast iron piston rings. The liquid which is used to displace the gas must be able to withstand the full range of temperatures and may for example be an ionic liquid or a liquid polysiloxane. In some embodiments, the high pressure side and the low pressure side use the same liquid in the air locks, in other embodiments they have different liquids, appropriate for the applicable temperature ranges.

The fluid working machines have the ability to independently vary their displacement of working fluid per rotation of the rotatable shaft and to swap between functioning as compressors and expanders. In this example, these are electronically commutated fluid working machines. The compressor and the expander can each be fluid working machines which comprise a plurality of working chambers of cyclically varying volume, in which the displacement of fluid through the working chambers is regulated by electronically controllable valves, on a cycle by cycle basis and in phased relationship to cycles of working chamber volume, to determine the net throughput of fluid through the machine.

Fluid working machines of this type are disclosed, for example, in EP 0 361 927 which introduced a method of controlling the net throughput of fluid through a multi chamber pump by opening and/or closing electronically controllable poppet valves, in phased relationship to cycles of working chamber volume, to regulate fluid communication between individual working chambers of the pump and a low pressure manifold. As a result, individual chambers are selectable by a controller, on a cycle by cycle basis, to either displace a predetermined volume of fluid or to undergo an idle cycle with no net displacement of fluid, thereby enabling the working chambers to function as a compressor with a displacement which can be matched dynamically to demand. EP 0 494 236 developed this principle and included electronically controllable poppet valves which regulate fluid communication between individual working chambers and a high pressure manifold, thereby facilitating the provision of a fluid working machine functioning as either a compressor or an expander in alternative operating modes. EP 1 537 333 introduced the possibility of part cycles, allowing individual cycles of individual working chambers to displace any of a plurality of different volumes of fluid to better match demand. In such machines, idle cycles which make no net displacement of working fluid can be interspersed with active cycles which make a net displacement of working fluid to meet a given demand (e.g. for pressure or fluid flow rate) and the active cycles can be switched between compressor (pumping) and expander (motoring) cycles.

Figure 5:
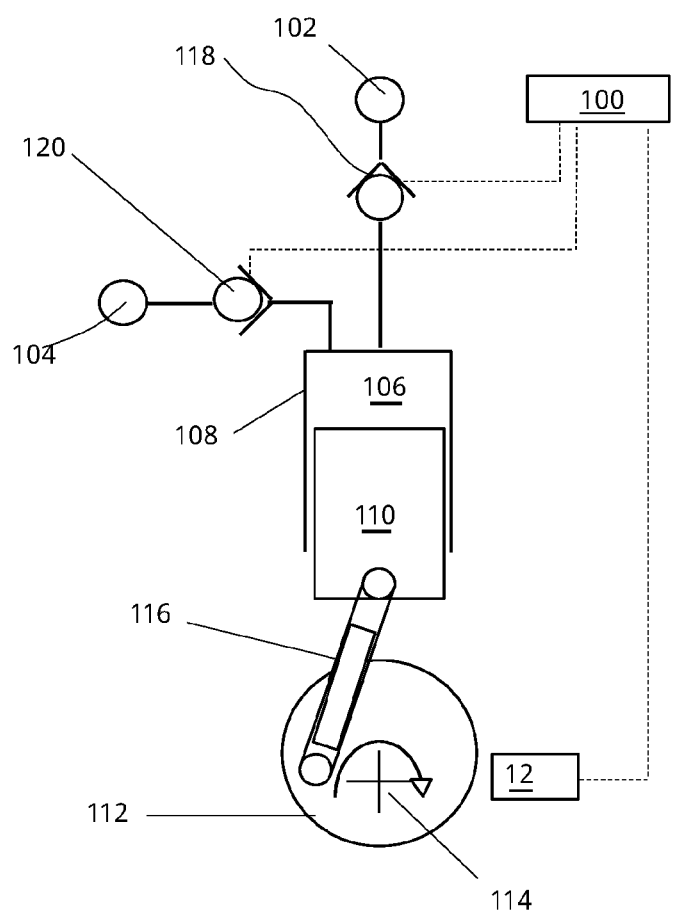
FIG. 5 is a schematic diagram of a working chamber of a fluid working machine.

With reference to FIG. 5, electronically commutated positive displacement machines of this type have a low pressure manifold 102 connected to the low pressure (and low temperature) side of the fluid circuit, and a high pressure manifold 104 connected to the high pressure (and high temperature) side of the fluid circuit. Each working chamber 106 of a plurality of working chambers is defined by the interior of a cylinder 108 and a piston 110 which is mechanically linked to the rotation of a cam 112 mounted on an axle 114 by a suitable mechanical linkage 116, and which reciprocates within the cylinder to cyclically vary the volume of the working chamber. A low pressure valve 118 regulates the flow of working fluid between the low pressure manifold and the working chamber. A high pressure valve 120 regulates the flow of fluid from the working chamber to the high pressure side of the fluid circuit. The example fluid working machine includes a plurality of working chambers mechanically linked to the rotation of the same axle, with appropriate phase differences. The controller reads shaft position from the shaft position sensor and uses this to regulate the phase of valve opening or closing cycles relative to cycles of working chamber volume and to determine the speed of shaft rotation. The low and high pressure valves are electronically actuatable under the active control of the controller.

During each expansion stroke of a working chamber, when functioning as a compressor, the low pressure valve is open and working fluid is received from the low pressure side of the fluid circuit. The controller may determine for each cycle of each working chamber whether the working chamber should then complete a full compressor (pumping) cycle by closing the low pressure valve and displacing the maximum possible volume of working fluid through the high pressure valve to the high pressure side of the fluid circuit, or an idle cycle in which the low pressure valve remains open and working fluid returns to the low pressure side. In order to carry out an expander (motoring) cycle, the low pressure valve is closed shortly before top dead centre, causing pressure to build up in the working chamber as the cylinder volume shrinks, enabling the high pressure valve to open under the active control of the controller. The high pressure valve is then opened by the controller and working fluid flows into the working chamber and is expanded. The high pressure valve is closed during the expansion stroke (typically early in the expansion stroke) and the pressure of the working fluid remaining in the working chamber drops as the working chamber continues to expand, enabling the low pressure valve to be opened and the working fluid to be vented to the low pressure side.

The apparatus is controlled by a controller 100 which regulates the operating of the electrical motor/generator 4, the fluid working machines, the various augers and the air locks, to operate the apparatus. The controller receives data from a variety of sensors, including the shaft position sensor 12 and the pressure sensors 94, as well as various temperature sensors distributed around the apparatus (not shown). It also has a control input 96 which receives instructions as to in which mode the apparatus should operate (e.g. energy storage, energy recovery, idling) or which provides some input which the controller monitors in order to determine how it should response (for example indications of grid load factor).

The apparatus has four main operating modes, these are an energy storing mode, an energy recovery (electricity generating) mode, an idling mode and a dormant mode.

In the energy storing mode, electrical energy from the grid drives motor 4 which rotates the shaft 6. The first fluid working machine 8 functions as a compressor and the second fluid working machine 10 functions as an expander. The electrical motor and the expander generate a torque in the same direction as each other and this drives the compressor. The compressor and the expander drive working fluid around the working fluid circuit (clockwise in FIG. 1). The glass beads moved from ambient hopper 30A, through conduit 34, air lock 36 and conduit 36 to the first side of the high temperature heat exchanger, where it is moved along the length of the heat exchanger, in direction 90, in contraflow to the working fluid, by the action of auger 44 driven by motor 46. Heat exchange takes place and the gas cools and the glass beads heat up. The high temperature heat exchanger is thereby functioning in its first operating mode, transferring heat to glass beads. After travelling through the horizontal heat exchange chamber the glass beads fall into pit 84 and are lifted through conduit 48 to the air lock 36 and then through conduit 50 to the top of hopper 30B where it is stored. The hopper is thermally insulated and heat can be retained for a long period of time. At the same time, glass beads are moved from ambient hopper 30D through conduit 58 and the low temperature air lock and conduit 60 to the second end of the low temperature heat exchanger. The auger within the low temperature heat exchanger moves the beads along the length of the heat exchanger, in direction 92, again in contra flow to the cooled working fluid received from the expander. Thus the low temperature heat exchanger functions in its first operating mode, cooling glass beads. The beads fall into the pit at the end of the heat exchanger and are lifted through conduit 68, passed through the air lock and lifted through conduit 64 to the top of hopper 30C.

The controller regulates the displacement of the compressor and expander to independently control the rate of circulation of working fluid and the pressure in the high pressure side of the working fluid circuit and the low pressure side of the working fluid (in particular the ratio of the pressure on the high pressure side of the working fluid circuit to the pressure in the low pressure side of the working fluid circuit), using pressure sensors 94.

Advantageously, the compressor and expander may each be electrically commutated fluid working machines comprising a plurality of working chambers having a volume which varies cyclically with rotation of the rotatable shaft (e.g. piston cylinders)

In an example, gas is compressed from about 20 bar in the low pressure side to 200 bar in the high pressure side, which heats it to around 400° C. and fees it into the high temperature heat exchanger. The gas leaves the high temperature heat exchanger at around 20° C. and 200 bar and is expanded back to 20 bar which cools it to around 120° C. The cooled gas is fed into the low temperature heat exchanger from which it emerges with a temperature of about 20° C. and pressure of 20 bar for further recirculation. The residence time of the beads in the heat exchangers is about 5 minutes.

In order to move into the energy recovery mode, the first fluid working machine switches to function as a compressor and at the same time the second fluid working machine switches to function as an expander. Now the expander drives motor 4 to function as an electricity generator, which generates electrical power to output to grid and continues to drive the compressor. The augers in the heat exchangers change direction of rotation. Hot beads are now conveyed from high temperature hopper 30B to ambient hopper 30A through conduit 52, the air lock, and conduit 52, and through the high temperature heat exchanger from second end 42 to first end 40, and then through conduit 56, the air lock and conduit 58 to the top of the ambient hopper 30A. The high temperature heat exchanger now functions in its second operating mode, with heat energy being transferred from thermal storage media to the working fluid. At the same time, on the low pressure side, cold beads are conveyed from hopper 30C to hopper 30D via conduit 66, the air lock, conduit 68, the auger through the low temperature heat exchanger, conduit 62, the air lock, and conduit 72, and the low temperature heat exchanger functions in its second operating mode, with thermal storage media warming the working fluid.

With the electronically commutated machines described above the switch from compression to expansion, or vice versa, can be implemented within one rotation of the rotatable shaft. The temperature of the glass beads in the high and low temperature heat exchangers therefore enables energy recovery and electricity generation to begin straight away even if there is a short delay in reversing the flow of beads.

Where the required, the apparatus may swap back to electricity storage within one rotation of the rotatable shaft by again swapping the function of the fluid working machines between compression and expansion, or vice versa, reversing the direction of movement of the augurs in the heat exchangers and changing the direction of movement of the glass beads around the high temperature and low temperature thermal storage media circulation paths.

The apparatus may have additional modes. For example, once fully charged, with the beads in high temperature storage hopper 30B and/or low temperature storage hopper 30C at predetermine threshold temperatures, the machine may temporarily shut down, retaining the hot and cold beads for later use when required, or operate in an idle mode in which the working fluid continues to be circulated at a relatively low flow rate but without the beads being further moved, or moved only slowly. This enables the machine to switch to energy recovery/electricity generation quickly when required. In the idle mode, the speed of rotation of the rotatable shaft may be maintained at above a threshold speed, such that the shaft remains synchronous with the electricity grid, to facilitate a rapid switch to energy recovery/electricity generation (by having the effect of ensuring that decision points to cause working chambers to carry out compressor or expander strokes as required are relatively frequent).

Figure 2:
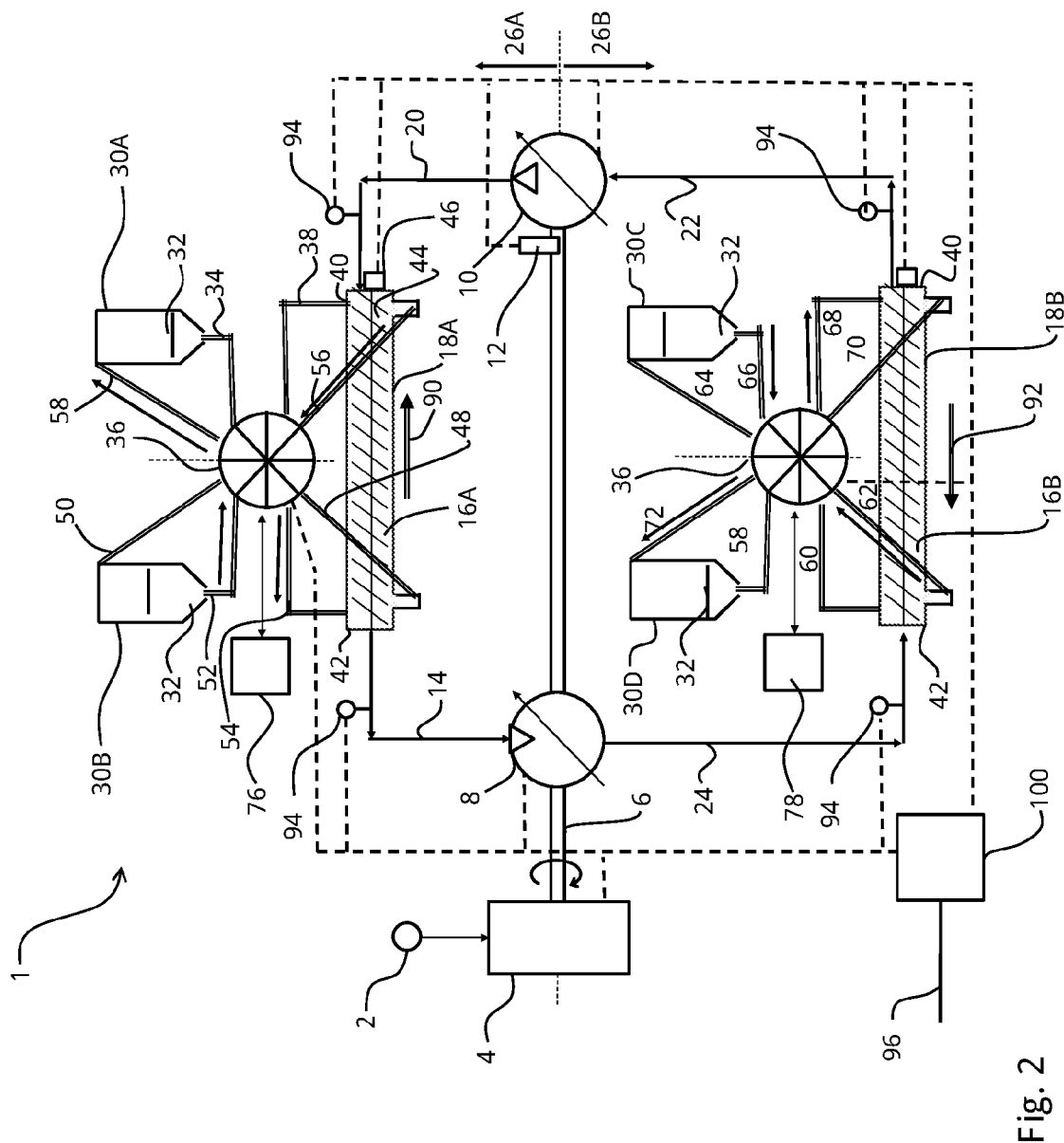
FIG. 2 is a schematic diagram of pumped heat energy storage apparatus, labelled to show operation during energy reclaim.
Figure 6:
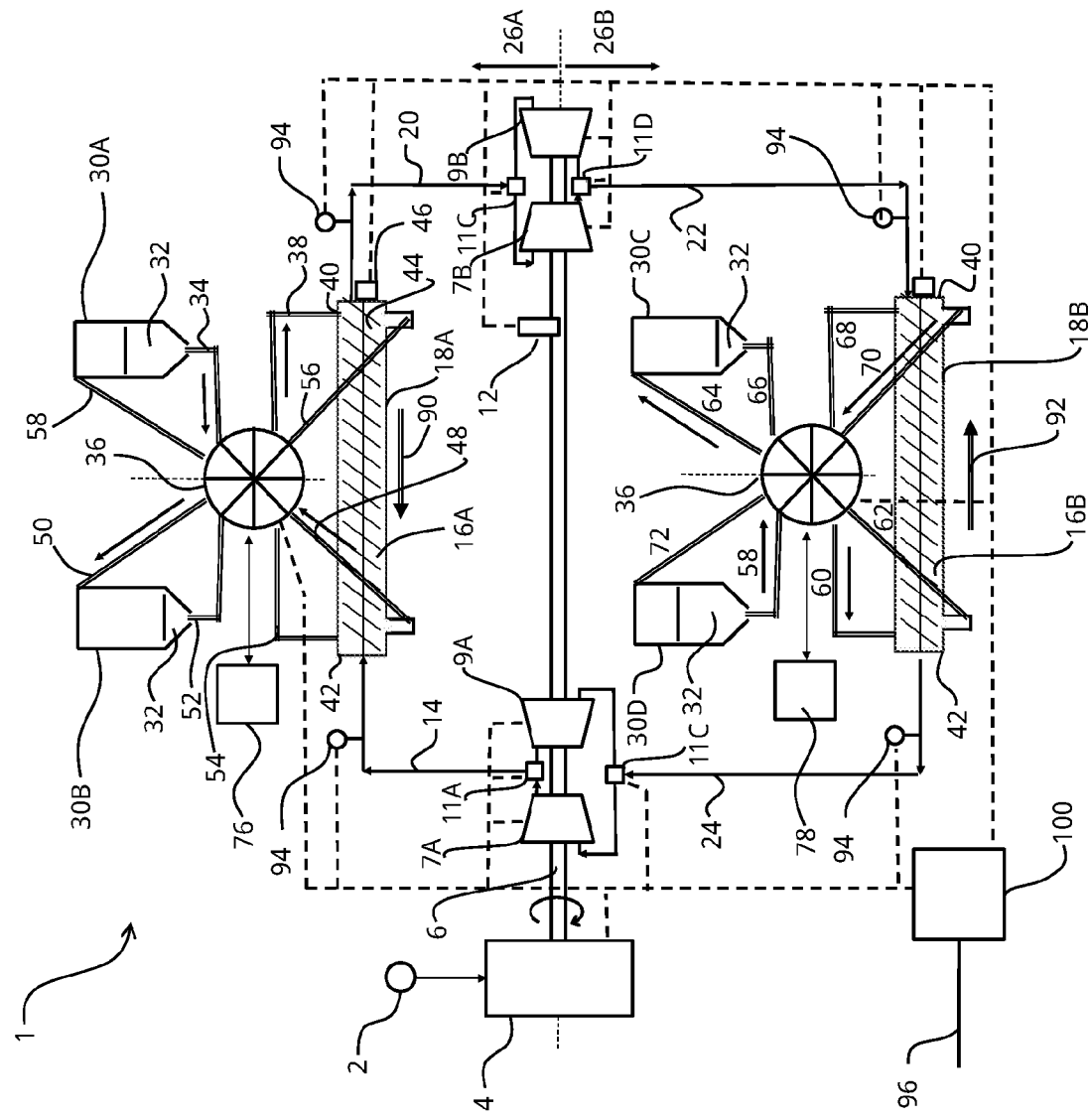
FIG. 6 is a schematic diagram of pumped heat energy storage apparatus using turbomachines, labelled to show operation during energy storage.

FIG. 6 illustrates an alternative embodiment of the invention, in energy storing mode (equivalent to FIG. 1). Instead of variable displacement machines operable as compressors or expanders 8, 10, the rotatable shaft 6 has a first dedicated compressor 7A, a first dedicated expander 9A, a second dedicated compressor 7B and a second dedicated expanded 9B, which may each be turbomachines (typically variable displacement turbomachines). Working fluid on the low pressure side flows through conduit 24 to switchable valve 11C, which, in the energy storage mode shown in FIG. 6, directs fluid to the first compressor 7A, where it is compressed and heated and transferred to the high pressure side via switchable valve 11A. Working fluid on the high pressure side flows through conduit 20 to switchable valve 11B where, in the energy storage mode, it is directed to dedicated expander 7B, where it is expanded and transferred to the low pressure side via switchable valve 11D. Beads are moved through the hoppers and heat exchangers as per FIG. 1. During operation, when the apparatus is switched to energy recovery mode, switchable valves 11A, 111B, 11C and 11D are all switched under the control of the controller so that working fluid from conduit 22 on the low pressure side passes through switchable valve 11D to expander 9B and then through switching unit 11B to conduit 20 on the high pressure side, and high pressure working fluid, which has passed through the heat exchanger 16A to conduit 14, flows through valve unit 11A to expander 9A and then to valve unit 11C and conduit 24 on the low pressure side. Accordingly, the direction of flow of working fluid around the working fluid circulation pathway and the direction of movement of beads through the heat exchangers can be reversed at the same time. Beads are then moved through hoppers and heat exchangers in directions corresponding to FIG. 2. The machines which are not being used at any given time (e.g. expander 9A and compressor 7B during energy storage, and compressor 7A and expander 9B during energy recovery) may be evacuated to reduce spinning losses. In this example the first and second fluid working machines of the first example, which work alternately as compressors or expanders, are effectively each replaced with a compressor and an expander where either the compressor or the expander functions at any given time.

The ability of the apparatus to switch from energy storage, or the idle mode, to energy recovery and electricity generation extremely quickly makes it very useful for supporting an electricity grid as it may switch to the generation of electricity rapidly should it be required. However, in general, the apparatus has provided a relatively simple and cost effective device with a relatively high efficiency and capacity for energy storage and maximum rates of power storage and/or recovery/regeneration.

Although in the examples, energy is received from and returned to an electrical grid, the apparatus is equally useful to store energy from other forms, for example in renewable power generation apparatus, such as wind and marine power generation apparatus, or to return energy to other forms, for example motive power. To this end, the apparatus can be adapted by using an alternative prime mover and power take off.

The examples above show a figure-of-eight pathway for movement of thermal storage media on each of the high pressure and low-pressure sides. However, alternative arrangements can be considered. For example, ambient hoppers 30A and 30D may be combined. Two, three, or greater than four hoppers may be employed. Thermal storage media may be recirculated continuously through the heat exchangers, progressively gaining or losing temperature as appropriate.

FIG. 7 through 11 illustrate an alternative embodiment of a pumped heat energy storage apparatus, according to the fifth and sixth aspects of the invention. In FIGS. 7 through 11, only the high pressure side of the machine is shown. The low pressure side generally corresponds and functions in the same way although the gas pressures are lower, but still significantly higher than ambient pressure. In this example the cold side heat exchanger operates at about 20 bar.

This embodiment again employs solid thermal storage media (glass beads in this example) and a reversible heat exchanger where gaseous working fluid (Argon in this example) is brought into thermal contact with the thermal storage media under pressure, according to the first through fourth aspects of the invention. Hoppers (functioning as media stores) store thermal storage media at ambient and also at raised and lowered temperatures. In this embodiment, the thermal storage media is stored in an atmosphere of argon, which is the working fluid, and so the interstitial gas does not need to be replaced, but does requires to be heated or cooled and transported across pressure gradients. The apparatus has four operating modes as set out above.

As before, there is a technical difficulty in avoiding loss of working fluid from the heat exchanger and avoiding the introduction of unwanted gas into the working fluid pathway which difficulty is increased by the pressure differential between the heat exchangers and the hoppers, especially where, as in this example, the hoppers store thermal storage media at ambient pressure.

Figure 7:
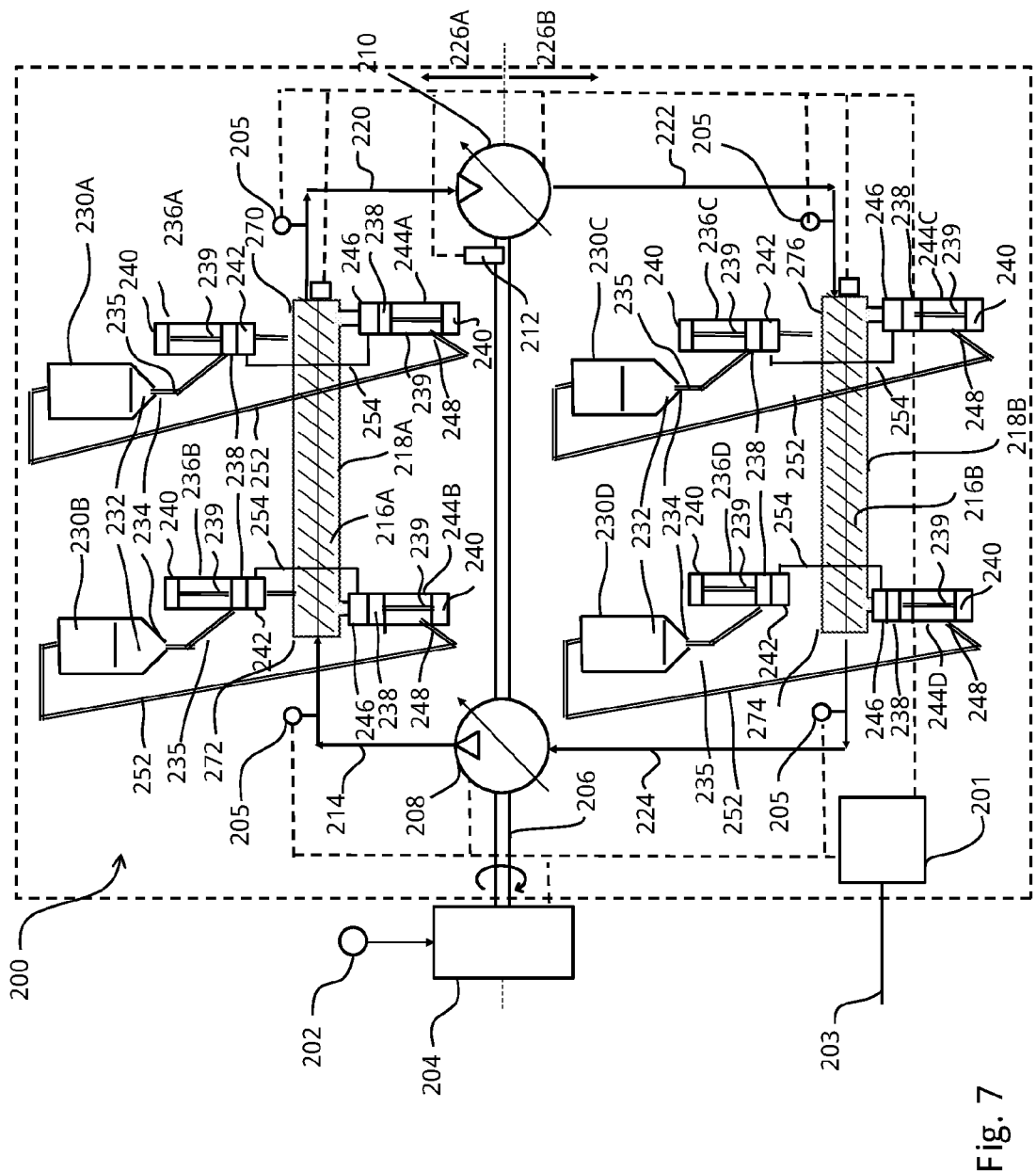
FIG. 7 is a schematic diagram of pumped heat energy storage apparatus using an alternative lockhopper configuration.
Figure 8:
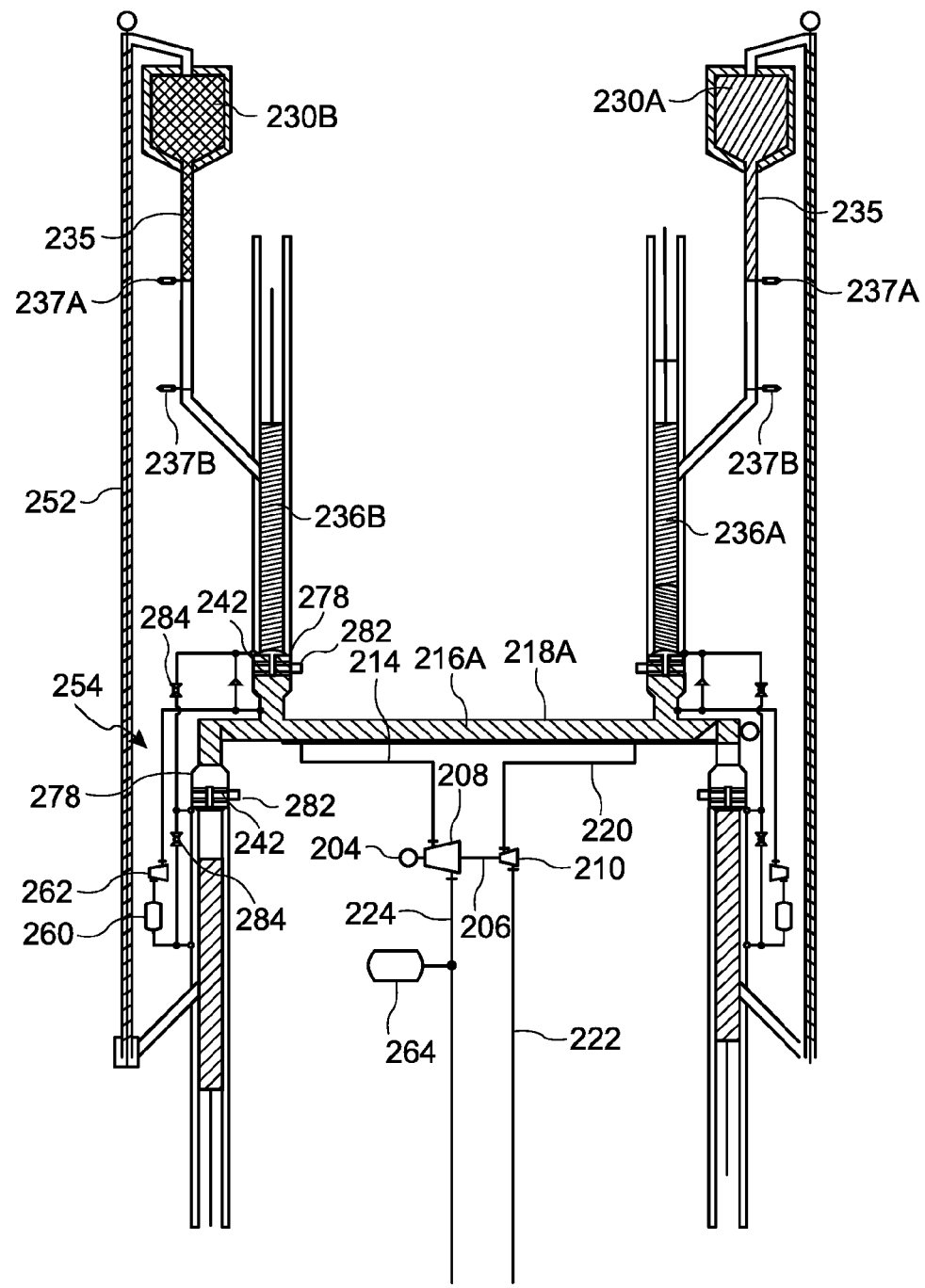
FIG. 8 is a schematic cross-section of the high pressure side of the heat exchanger and lockhopper components of the apparatus of FIG. 7.
Figure 9:
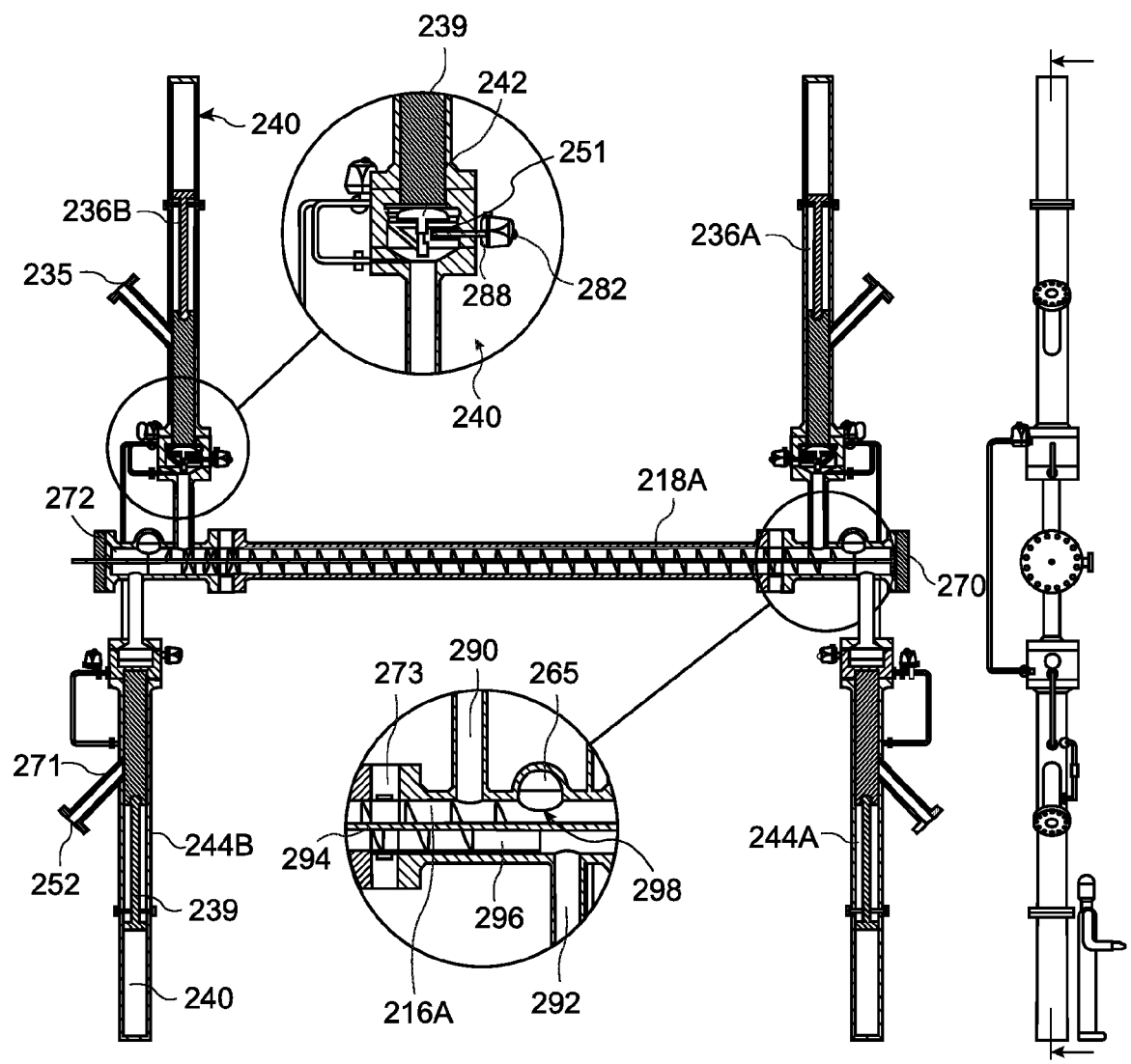
FIG. 9 is a partial cross-sectional view of the high pressure side of the heat exchanger and lockhopper components of the apparatus of FIGS. 7 and 8.

With reference to FIGS. 7 to 9, the pumped heat energy storage apparatus 200 comprises an electrical interface 202 through which an electrical motor 204 is connected to an electrical network. In this example, the electrical motor is reversible to function as an electrical generator, although a separate electrical generator may be provided. The electrical motor drives a rotatable shaft 206 which is coupled to first and second fluid working machines 208, 210 which are synthetically commutated machines as described above relation to FIG. 5 which are capable of operating as compressors or expanders in alternative operating modes and which are operable to reverse the direction of working fluid flow around a closed loop working fluid circulation pathway. A shaft position sensor 212 monitors the position and speed of rotation of the rotatable shaft. A controller 201 controls the function of each valve and actuator responsive to instructions received through a control interface 203 and measurements from sensors such as pressure sensors 205 and shaft position and speed sensor 212.

The apparatus has a high pressure side 226A and low pressure side 226B (which can alternatively or in addition be seen as high and low temperature sides). The working fluid circulation pathway 208, 214, 216A, 220, 210, 222, 216B, 224, 208 includes a high pressure conduit 214 which extends from the first fluid working machine 208 to a heat exchanger chamber 216A of high pressure side heat exchanger 218A (high temperature heat exchanger) and then to the high pressure side of the second fluid working machine 210 through second high pressure conduit 220. The arrows on the conduits show the direction of working fluid flow during energy storage and that direction reverses during energy recovery.

The apparatus further comprises high pressure and low pressure side thermal media storage paths. On the high temperature side, hopper 230A stores ambient temperature beads 232 (thermal storage media), hopper 230B stored heated beads and on the low temperature side, hopper 230C stores cooled beads and hopper 230D stores ambient temperature beads. During energy storage the beads move through the high pressure heat exchange chamber 216A from a first end 270 to second end 272 and through the low pressure heat exchange chamber 216B from a first end 274 to a second end 276, i.e. in the opposite direction to the direction of flow of working fluid through the heat exchange chambers. During energy recovery the beads move in the opposite directions, on the high temperature side from hopper 230B, through the heat exchange chamber from second end 272 to first end 270, to hopper 230A, and on the low temperature side from hopper 230C to second end 276 of low temperature side heat exchanger 218B, to the first end 274 and then to hopper 230D. As will be described the path by which the beads are loaded into and unloaded from the heat exchange chamber at either end of the heat exchange chamber are different with inlets for receiving beads downward from the hopper by gravity and outlets for outputting beads downward by gravity before they are raised to the hopper.

Typically when the apparatus is fully discharged all beads are at ambient temperature (and pressure) and there are no beads in hoppers 230B and 230C and when the apparatus is fully charged the ambient hoppers 230A and 230D are empty. In this example beads in all hoppers (230A, 230B, 230C, 230D) are stored at atmospheric pressure in an Argon atmosphere and the working fluid and beads circulate within a gas-tight environment or enclosure, shown schematically by bounding box 260.

As before, low and high pressure refer to pressure relative to each other. Typically both the low and high pressure sides of the working fluid circulation pathway are at greater than atmospheric pressure throughout.

Each hopper 230A, 230B, 230C, 230D has an outlet port 234 at its base through which beads may be controllably released by way of valves 237A, 237B(shown in FIG. 8) under the control of machine controller 201, under gravity, through a conduit 235, into a respective loading cylinder 236A, 236B, 236C, 236D (functioning as transfer chambers or working chambers depending on the mode of operation, as will be described), when a respective sleeve valve 238 is opened under the control of the machine controller 201. The conduit and valves function as a conveyor from the media store into the transfer cylinder. Within each transfer cylinder a piston 239 is slidably mounted and moveable by an actuator 240 under the control of machine controller 201. At the base of each loading cylinder is a bead release valve 242 which is again under the control of the machine controller. Beads may enter the loading cylinder when the piston is raised and the sleeve valve is open and may leave the loading cylinder through the bead release valve, into the respective heat exchange chamber 216A or 216B, when the bead release valve is opened. The beads may leave the loading cylinder by the action of gravity or may be displaced by the piston.

Each hopper 230A, 230B, 230C, 230D may also be controllably fed with beads from the respective heat exchanger through unloading cylinders 244A, 244B, 244C, 244D (functioning as working chambers or transfer chambers depending on the mode of operation), which each have an inlet valve 246, controlled by the machine controller, through which beads may be received from the heat exchanger through gravity, an outlet 248, a piston 239, which occludes the outlet until it is retracted to BDC, and an actuator 240, the sleeve valve and actuator again being under the control of the machine controller. The outlet extends to a conveyor system 252 which uses one or more augers to raise the beads to the inlet of the respective hopper. Gas pipework 254 and an associated control system are described in more detailed with reference to FIGS. 8 and 9.

During operation in energy storage mode, working fluid circulates around the working fluid circulation pathway in a clockwise direction as shown in FIG. 7, and is compressed by fluid working machine 208 and expanded by fluid working machine 210. On the high pressure side 226A, ambient beads are fed from hopper 230A through loading cylinder 236A into heat exchange chamber 216A of heat exchanger 218A where they are conveyed from right to left in FIG. 7. They pass out of unloading cylinder and are transported to high temperature hopper 230B through an auger lift, and on the low pressure side 226B, ambient beads are fed from hopper 230D, in through loading cylinder 236D, through heat exchanger 218B, out of unloading cylinder 244C, to low temperature hopper 230C, again via an auger lift. During operating in energy recovery mode, fluid working machine 208 operates as an expander and fluid working machine 210 operates as a compressor, the direction of flow of working fluid and of movement of beads through the heat exchangers reverses, and the loading and unloading cylinders swap roles.

As before, the apparatus may have additional modes. For example, once fully charged, with the beads in high temperature storage hopper 230B and/or low temperature storage hopper 230C at predetermined target temperatures, the machine may temporarily shut down, retaining the hot and cold beads for later use when required, or operate in an idle mode in which the working fluid continues to be circulated at a relatively low flow rate but without the beads being further moved, or moved only slowly. This enables the machine to switch to energy recovery and electricity generation quickly when required. In the idle mode, the speed of rotation of the rotatable shaft may be maintained at above a threshold speed, such that the shaft remains synchronous with the electricity grid, to facilitate a rapid switch to energy recovery/electricity generation (by having the effect of ensuring that decision points to cause working chambers to carry out compressor or expander strokes as required are relatively frequent).

The loading cylinders 236A, 236B, 236C, 236D function as part lockhoppers used to load beads into the heat exchanger without loss of gaseous working fluid with both the beads and surrounding gaseous working fluid raised to the heat exchanger input pressure. While loading takes place, the corresponding unloading cylinder (244A, 244B, 244C, 244D respectively) functions as a recovery cylinder for the recovery of gaseous working fluid.

The high pressure side of the apparatus 226A is shown in further detail in FIGS. 8 and 9. Features which correspond to those shown in FIG. 6 are numbered consistently. Conduit 235 which conveys beads to the loading cylinders comprises upper and lower knife valves 237A, 237B which are operable by the control to dispense a predetermined volume of beads into the relevant loading chamber. At the base of each loading cylinder a bead valve housing 278 includes a bead valve 242 and bead valve actuator 282 operable under the electronic control of the controller to transport beads (and interstitial working fluid) from the loading chamber into the heat exchanger under gravity. At the top of each unloading cylinder a further bead valve housing 278 includes an annular bead valve 242, supported on a bead valve spider 251, and bead valve actuator 282 operable to open the valve through actuation shaft 288 under the electronic control of the controller to transport beads (and interstitial working fluid) from the heat exchanger into the unloading chamber by the action of gravity.

At each end of the heat exchange chamber pipework 254 extends between the loading chamber and the unloading chamber and the heat exchange chamber and contains electronically operated valves 284 which are controllable by the controller and also a check valve 286. The controllable valves are openable and closable to provide a connection between the loading and unloading chambers and the check valve allows working fluid to pass from the loading chamber to the heat exchange chamber when the pressure of working fluid exceeds the pressure within the heat exchange chamber. An auxiliary cylinder 260 is connected to the unloading chamber to receive excess argon working fluid which is continuously pressurised and transferred to the heat exchanger by compressor 262 when the unloading chamber is being used as the transfer chamber. The apparatus including the media stores is as a whole gastight and so although working fluid may be lost from the working fluid circulation pathway during operation it can be continuously replenished as required. Outlet 248 in the unloading cylinders provides a path for beads to pass out of the unloading cylinder when the unloading cylinder piston is sufficiently retracted, whereupon they are returned to the relevant media store through an auger lift. A low pressure reservoir 264 maintains a boost pressure.

The first end 270 of high pressure heat exchanger 218A is shown inset in FIG. 9 (the other end of this heat exchanger and both ends of low pressure heat exchanger 218B correspond). Inlet 290 receives beads from loading cylinder 236A. Outlet 292 provides a path for beads to fall into unloading cylinder 244A. Auger 294 (surrounded by auger liner 296) is rotatable in either direction by an auger motor to convey beads in either direction through the heat exchange chamber. Auger weir 298 is used to maintain a target depth of beads in the heat exchange chamber and there is a raised roof portion 265 directly above the weir to provide sufficient clearance. Gas injector port 273 provides a route for working fluid to enter the heat exchange chamber from the compressor 262 or loading cylinder via check valve 286.

The various steps of the process of loading thermal storage media into the high pressure heat exchanger 18A from the ambient storage hopper 230A are illustrated with reference to FIGS. 10A through 10E. Each figure shows a successive step of the procedure which repeats cyclically. For clarity, only a limited number of key features are highlighted.

Table 1 below shows pressures and temperatures in the heat exchanger inlet, loading cylinder, and recovery cylinder at each step in an example implementation.

TABLE 1

| State | A | B | C | D | E |
|---|---|---|---|---|---|
| Heat exchanger pressure (bar) | 198 | 198 | 198 | 198 | 198 |
| Heat exchanger temperature (° K) | 420 | 420 | 420 | 420 | 420 |
| Loading cylinder pressure (bar) | 1.0 | 14 | 230.5 | 198 | 198 |
| Loading cylinder temperature (° K) | 420 | 159 | 485 | 420 | 420 |

TABLE 1-continued

| State | A | B | C | D | E |
|---|---|---|---|---|---|
| Loading cylinder piston position | BDC | BDC | BDC | BDC | TDC |
| Working chamber pressure (bar) | 17.9 | 14 | 230.5 | 198 | 198 |
| Working chamber temperature (° K) | 163 | 159 | 485 | 420 | 42- |
| Working chamber piston position | BDC | BDC | TDC | TDC | Intermediate |

One skilled in the art will appreciate that bottom dead centre (BDC) refers to maximum working chamber volume and top dead centre (TDC) refers to minimum working chamber volume although in practice, for the loading cylinder, the piston will be at a lower height at TDC than at BDC.

In an initial state (state A) illustrated in FIG. 10A, loading cylinder 236A (functioning as the transfer chamber) is at bottom dead centre (BDC, maximum working chamber volume), and is filled with glass beads 232 (thermal storage media) and interstitial argon working fluid at ambient temperature and pressure, the loading cylinder piston touches the top of the glass bead stack. The corresponding unloading cylinder 244A functions as a working chamber. It is also at BDC and it is filled with intermediate, low temperature argon. This initial state of the unloading cylinder is obtained at the end of a previous cycle as will be described below.

Next, to reach state B, shown in FIG. 10B, the loading and unloading cylinders are connected by opening valves in a first gas conduit path 254 under the control of the machine controller. This allows isenthalpic free expansion of gas between the two which is an irreversible process. There is no movement of the cylinders and no mechanical work is done. This raises the gas pressure in the loading cylinder to an intermediate pressure (neither the high pressure of the heat exchanger chamber nor the pressure of the ambient media store), without mechanical work.

Figure 10D:
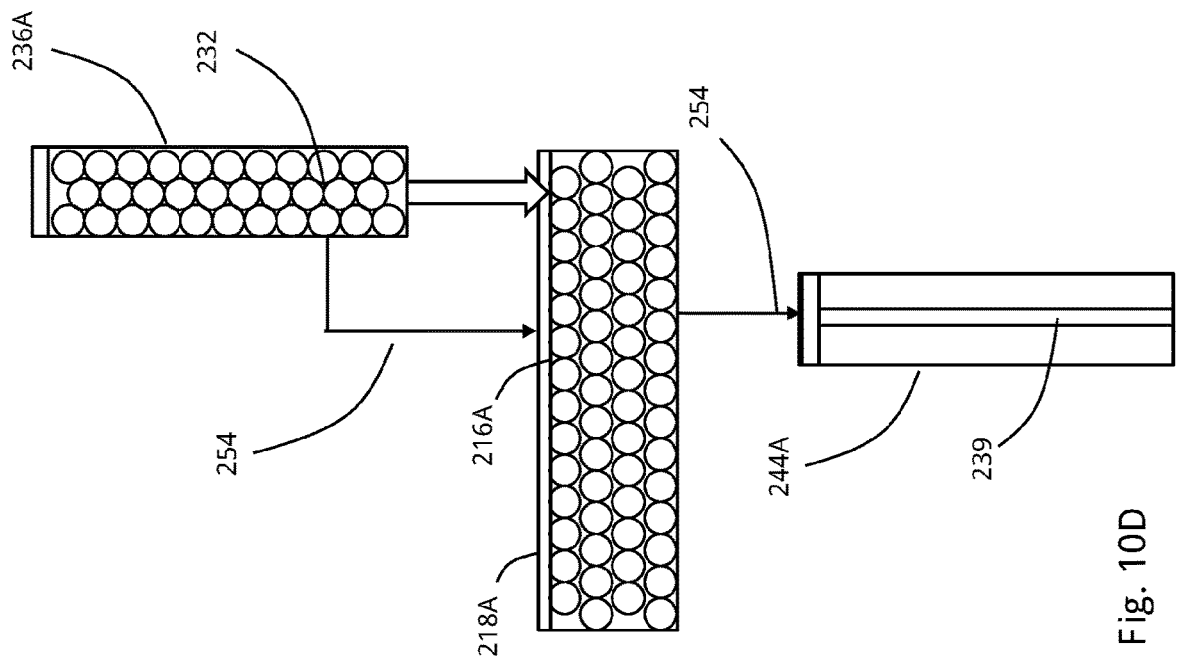
Figure 10C:
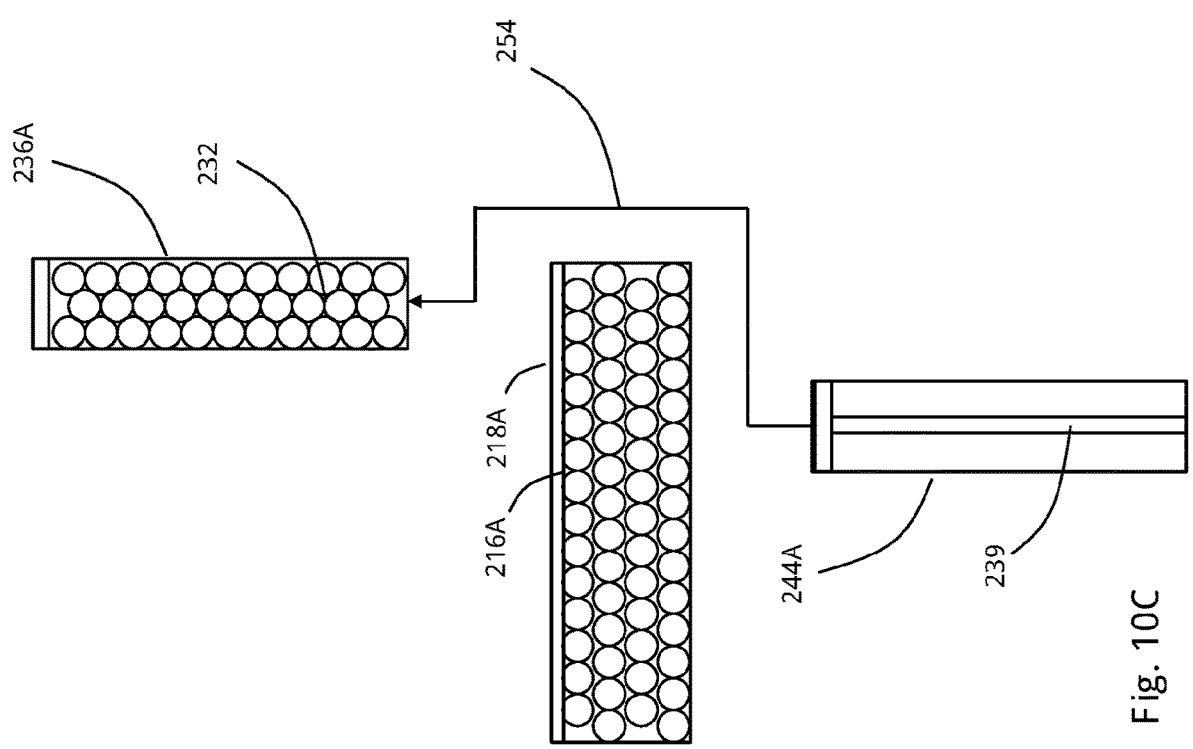

In order to reach state C, shown in FIG. 10C, the loading and unloading cylinders remain connected and the piston of the unloading cylinder travels upwards to top dead centre (TDC, minimum working chamber volume) compressing gas in both the loading and unloading cylinders. The pressure and gas temperature in the loading and unloading cylinders becomes higher than the pressure and gas temperature in the heat exchanger at the end into which the thermal storage media is to be loaded. In an example embodiment the power consumption by unloading cylinder in compressing the gas amounted to 32.4 kW gas averaged over a loading cycle.

In order to reach state D, shown in FIG. 10D, valves are opened and closed to connect each of the loading and the unloading cylinder directly to the heat exchanger through conduits 254. The gas in the loading cylinder (and unloading cylinder) mixes with the gas in the heat exchanger. Once the pressure in the loading cylinder and the heat exchanger equalises the bead valve 280 opens and the beads drop into the heat exchanger. No mechanical work is done.

Figure 10E:
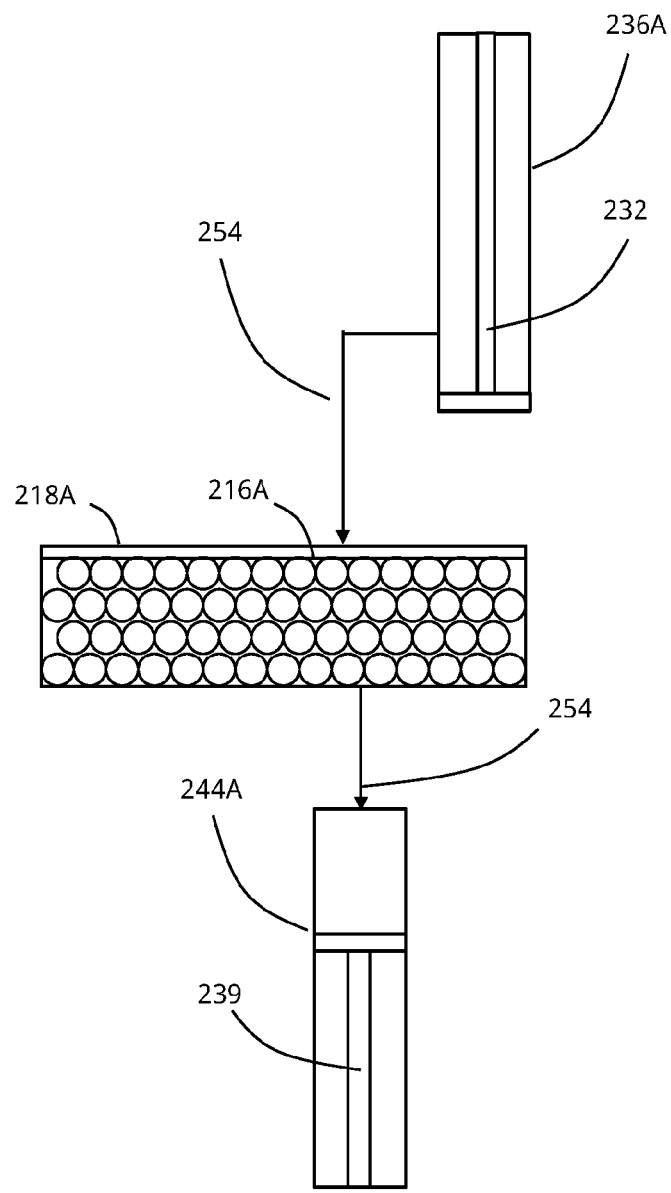

In order to reach state E, shown in FIG. 10E, the loading and unloading cylinders remain connected to the heat exchanger through gas conduits and the loading cylinder piston moves from BDC to TDC as the glass beads fall, delivering the glass beads and interstitial gas into the heat exchanger. At the same time, the unloading cylinder piston travels from TDC to a position intermediate BDC and TDC so that the volume swept by the piston equals the initial loading cylinder void volume (the interstitial volume around the beads). This sucks out some excess working fluid which has been delivered to the heat exchanger with the glass beads, recovering working fluid which would otherwise be lost from the heat exchanger and maintaining the amount of working fluid and pressure in the heat exchanger. At the same time knife valves 237A and 237B are operated in sequence to load a predetermined volume of beads into the space therebetween (an upper valve is opened while the bottom valve remains closed to receive a predetermined volume of storage media and then the upper valve is closed and the bottom valve opened to later dispense the storage media).

In order to return to state A, the loading and unloading cylinders are disconnected from the heat exchanger and each other. The loading cylinder is connected to the ambient media store 230A and its piston travels upwards to BDC and it fills with beads through valve 239, along with the ambient gas located interstitially in the beads. The unloading cylinder piston moves to BDC driven by the pressure of the working fluid which it retains, the working fluid expands adiabatically and the actuator 240 of the unloading cylinder recovers energy from the work done by the gas. This assumes that the actuator is capable of energy recovery (for example is an electrical motor which can be driven in reverse as an electrical generator) although alternatively a separate device can be employed to recovery energy in this step. In an example embodiment, energy is recovered at an average rate of 25 kW.

Thus a full loading cycle has been completed and can be repeated. Energy used to compress working fluid in the unloading cylinder (functioning as the working chamber) is partially recovered.

At the same time, glass beads are unloaded at the other end of the heat exchanger via the respective unloading cylinder. The unloading procedure is now described with reference to FIGS. 11A through 11F. Table 2 below shows pressures and temperatures in the heat exchanger inlet, unloading cylinder 244B (functioning as a transfer cylinder), and in the loading cylinder 236B which is used as a working chamber, and in an auxiliary cylinder 260 which is used for gas reclaim, at each of 6 stages which are repeated cyclically in an example implementation.

TABLE 2

| State | A | B | C | D | E | F |
|---|---|---|---|---|---|---|
| Heat exchanger pressure (bar) | 197 | 197 | 197 | 197 | 197 | 197 |
| Heat exchanger temperature (° K) | 671 | 671 | 671 | 671 | 671 | 671 |
| Unloading cylinder pressure (bar) | 197 | 197 | 19.9 | 1.0 | 1.0 | 1.0 |
| Unloading cylinder temperature (° K) | 671 | 671 | 268 | 259 | 671 | 671 |
| Unloading cylinder piston position | TDC | BDC | BDC | BDC | BDC | TDC |
| Working chamber pressure (bar) | 197 | 197 | 19.9 | 197 | 197 | 197 |
| Working chamber temperature (° K) | 671 | 671 | 268 | 671 | 671 | 671 |
| Working chamber piston position | Intermediate | TDC | BDC | Intermediate | Intermediate | Intermediate |
| Ambient cylinder pressure (bar) | 1.0 | 1.0 | 1.0 | 1.0 | 1.0 | 1.0 |
| Ambient cylinder temperature (° K) | 259 | 259 | 259 | 259 | 259 | 259 |

In an initial state (state A) illustrated in FIG. 11A, the unloading cylinder 244B is at TDC and is connected to the heat exchanger 218A and ready to accept heated glass beads from the heat exchanger. The loading cylinder 236B is at a position intermediate TDC and BDC and is partially filled with hot, pressurised argon working fluid.

In order to reach state B, illustrated in FIG. 11B, the unloading cylinder and loading cylinder and heat exchanger are all connected to each other. The unloading cylinder piston retracts, travelling to BDC while receiving hot glass beads from the heat exchanger while the loading cylinder travels to TDC shunting argon into the heat exchanger, replacing the interstitial gas which would otherwise be lost into the unloading cylinder with the glass beads. No mechanical work is carried out in this step.

Figure 11D:
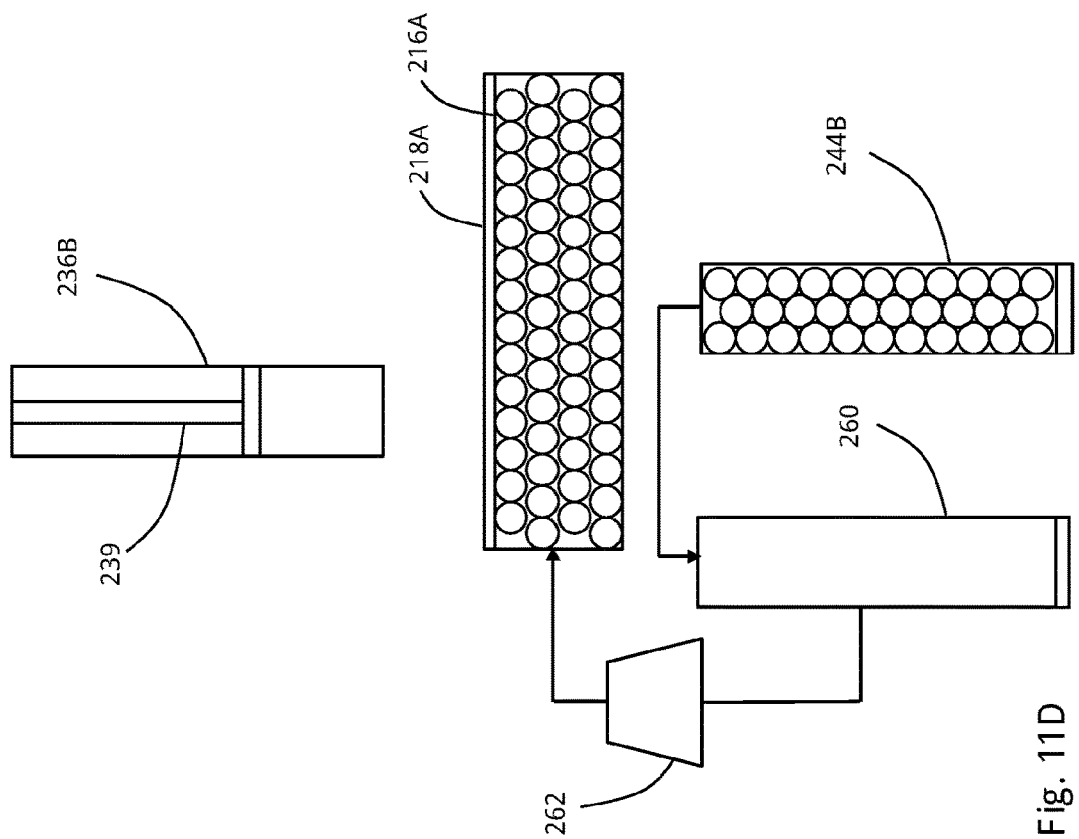
Figure 11C:
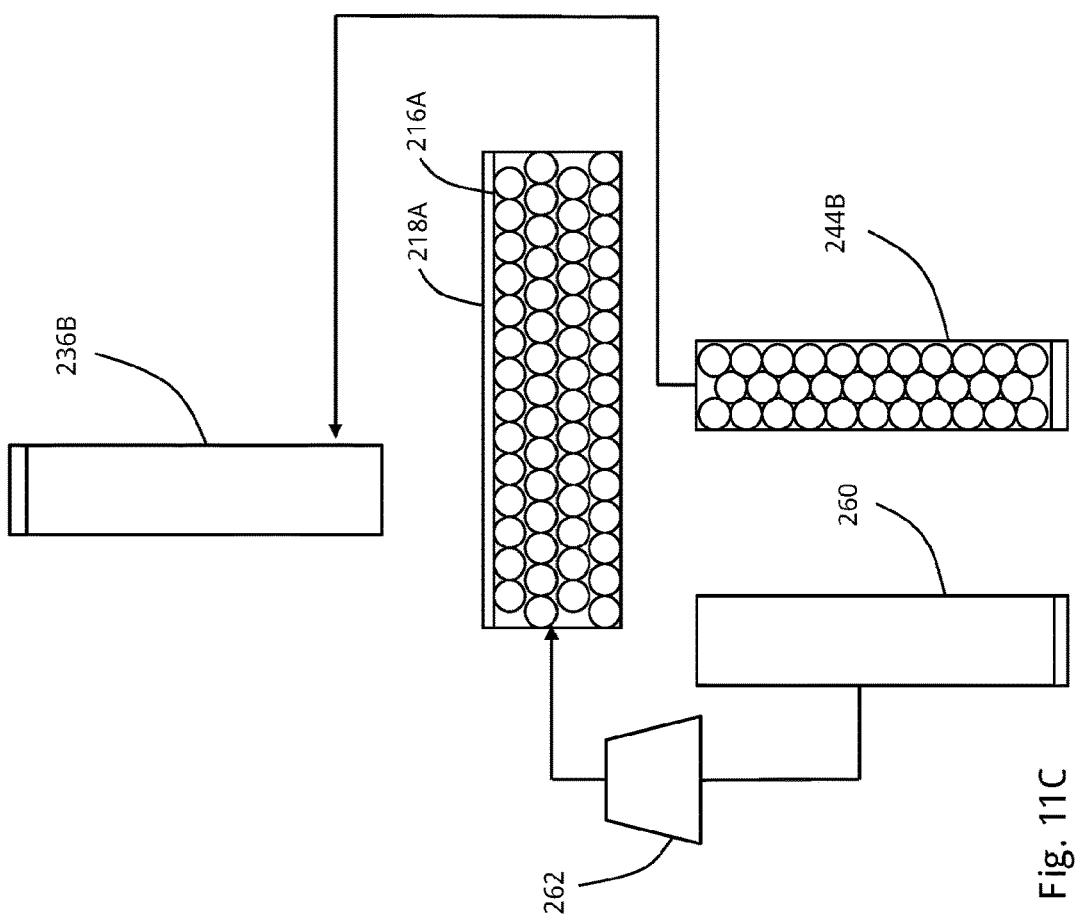

In order to reach state C, illustrated in FIG. 11C, the unloading and loading cylinders are disconnected from the heat exchanger, with the bead valves 242 connecting these cylinders to the heat exchanger both closed, but they remain connected to each other through gas pipework 254. Gas remaining in the loading cylinder is expanded adiabatically and the loading cylinder piston travels to BDC while the actuator of the loading cylinder recovers energy from the work done by the expanding gas. In an example embodiment the power recovered by the loading cylinder piston driven by the expanding gas amounts to 24.58 kW, averaged over an unloading cycle.

In order to reach state D, illustrated in FIG. 11D, the unloading and loading cylinders are disconnected. The unloading cylinder is connected to the ambient cylinder 260 through an aperture in the unloading cylinder at around TDC and valves 284. This allows isenthalpic free expansion of gas between the unloading cylinder and the ambient cylinder. The loading cylinder piston travels to a position intermediate TDC and BDC, compressing gas in the loading cylinder and returning gas to the heat exchanger through the check valve 286 once pressure in the loading cylinder exceeds the pressure in the heat exchanger. In an example embodiment the piston does 18.56 kW of work in compressing the gas.

Figure 11E:
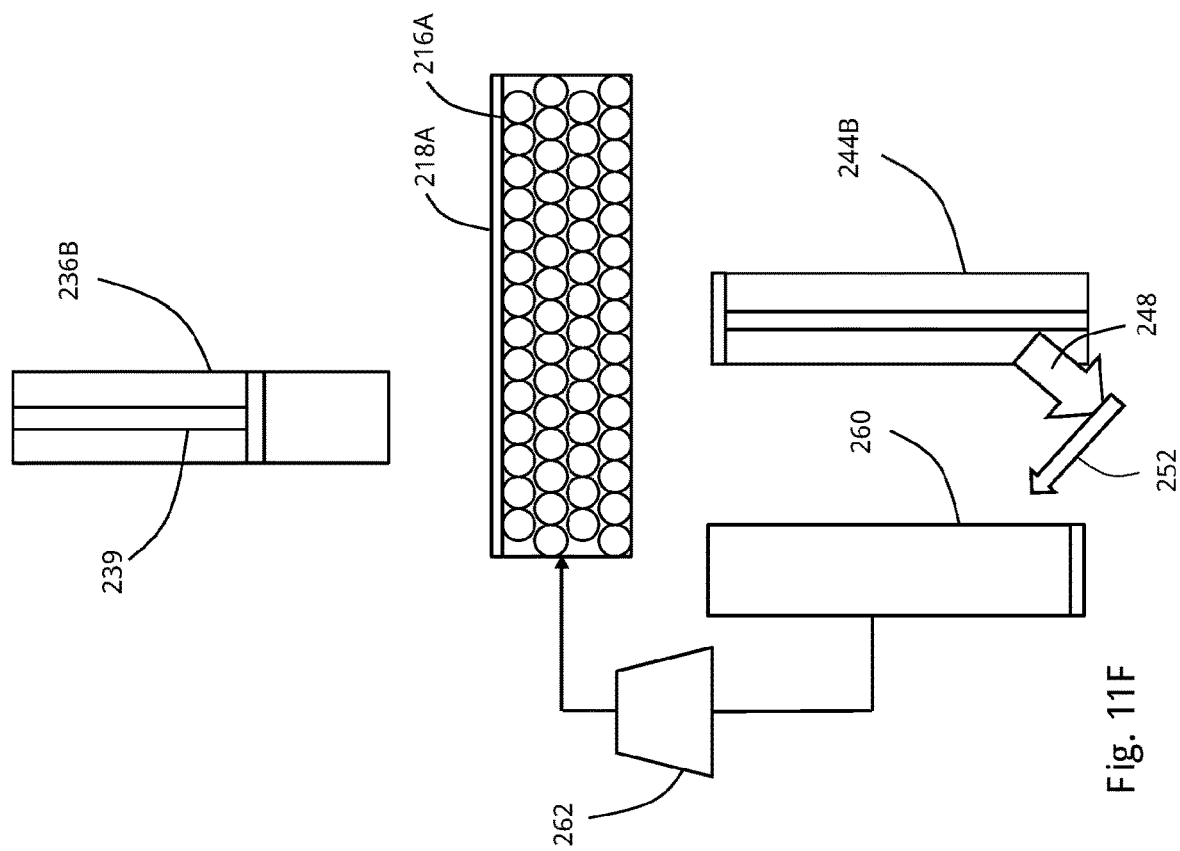

In order to reach state E, illustrated in FIG. 11E, the unloading cylinder is connected to the high temperature media store 230B and the hot glass beads in the unloading cylinder are displaced to the high temperature media store via the action of the unloading cylinder conveyor 252 through outlet 248 which is usually occluded but opened when the unloading cylinder is at BDC. The unloading cylinder piston retracts sufficiently far to enable the beads to exit through this outlet and the conveyor 252 rather than the unloading cylinder piston raises the glass beads to the level of the entry to the high temperature media store.

Figure 11F:
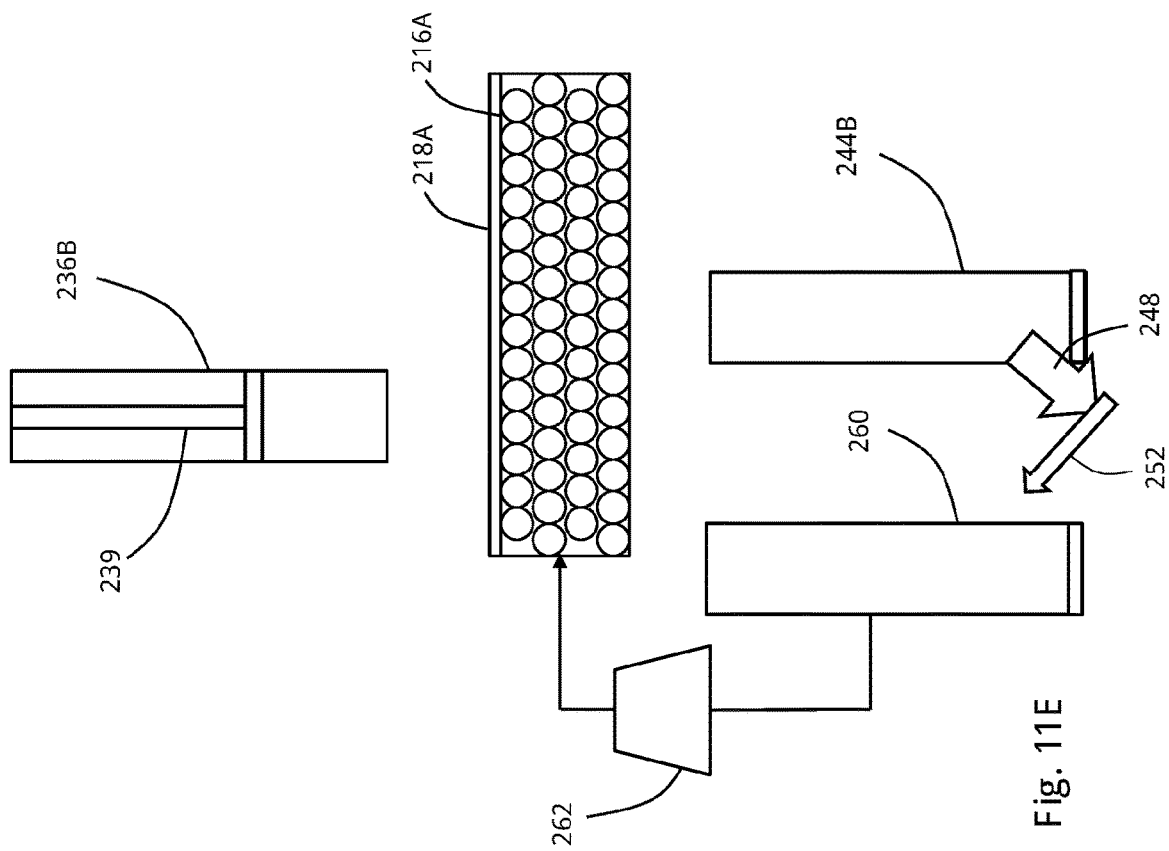

In order to reach state F, illustrated in FIG. 11F, the unloading cylinder remains connected to the high temperature media store, the unloading cylinder piston travels to TDC ready for the next unloading cycle and in the process displaces low pressure argon to the high temperature media store 230B.

In order to return to state A, the loading and unloading cylinders, the heat exchanger and the high temperature media store are all sealed from each other.

Throughout this process, ambient gas from the ambient cylinder 260 is compressed using a multi-stage compressor 262 and injected into the heat exchanger to maintain the required mass of working fluid in the working fluid circuit. In the worked example, average power consumption in recompressing ambient gas amounts to 14.88 kW over an unloading cycle.

The unloading procedure then repeats from state A for as long as unloading is required using unloading cylinder 244B.

The processes set out in FIGS. 10A through E and in FIGS. 11A through F take place concurrently during energy storage and there is a net movement of beads from the ambient media store to the high temperature media store. When the machine switches to energy recovery/electricity generation, the direction of movement of the beads through the heat exchanger reverses, and beads are loaded into the heat exchanger from media store 230B with loading cylinder 236B functioning as the transfer cylinder and unloading cylinder 244B functioning as the working chamber for the loading process of FIGS. 10A to E, and with unloading cylinder 244A functioning as the transfer cylinder and loading cylinder 236A functioning as the working chamber for the process of unloading beads from the heat exchange chamber to media store 236A according to the process of FIG. 11A to F.

Although the embodiment illustrated in FIGS. 7 through 11F uses reversible synthetically commutated machines according to FIG. 5, the machine may also have adaptations corresponding to the differences between FIGS. 1 and 6 to use turbomachine compressors and expanders. Although in the examples, the working fluid is a gas throughout the working fluid circulation pathway, not only in the heat exchanger chambers where it contacts the solid thermal storage media, it is possible for the working fluid to be a liquid in at least part of the working fluid circulation pathway. The heat exchangers could instead be operated within a working fluid which is a liquid around the working fluid circulation pathway.

The invention claimed is:

1. A method of transferring thermal storage media from a media store to a heat exchange chamber, or vice versa, across a pressure differential, in an apparatus comprising a working fluid circulation pathway, the working fluid circulation pathway comprising a heat exchanger which comprises the heat exchange chamber, wherein the apparatus is a pumped heat energy rage apparatus, the thermal storage media is a solid and the wo king fluid, as a gas, is brought into direct contact with the thermal storage media in the heat exchange chamber and thereby transfers heat to or from the thermal storage material, the method comprising:
  receiving thermal storage media into at least one transfer chamber in the presence of gaseous working fluid,
  decreasing or increasing the volume of at least one working chamber to there dress or expand working fluid in the at least one transfer chamber while the at least one transfer chamber is fluidically connected to the at least one working chamber, and
  recovering energy from the work done by working fluid on the at least one working chamber while the working fluid expands,
  wherein the thermal storage media is transferred into the at least one transfer chamber from a media store, the volume of the at least one working chamber is decreased to compress working fluid in the at least one transfer chamber and then the thermal storage media and at least some of the compressed working fluid is transferred from the at least one transfer chamber to the heat exchange chamber.

2. A method according to claim 1, wherein, after thermal storage media is transferred into the at least one transfer chamber, at least one transfer chamber is connected to the at least one working chamber and pressurised working fluid in the at least one working chamber passes into the at least one transfer chamber and increases the pressure of working fluid in the at least one transfer chamber, wherein the pressurised working fluid in the at least one working chamber was previously received into the at least one working chamber from the heat exchange chamber, and as a result pressurised gas received from the heat exchange chamber is used subsequently to partially pressurise the at least one transfer chamber while it retains thermal storage media.

3. A method according to claim 1, wherein when the volume of the at least one working chamber is reduced, the pressure in the at least one transfer chamber is increased to at least the pressure in the heat exchange chamber at the location where the thermal storage media is to be introduced;
  and/or wherein after the step of compressing the working fluid in the at least one transfer chamber, the at least one transfer chamber is connected to the heat exchange chamber and working fluid is allowed to circulate therebetween; and/or
  wherein while thermal storage media is displaced into the heat exchange chamber, the volume of the at least one working chamber increases and there is a net flow of working fluid from the heat exchange chamber into the at least one working chamber; and/or
  wherein the method comprises disconnecting the at least one working chamber from the heat exchange chamber and then expanding the working fluid remaining within the at least one working chamber.

4. A method of transferring thermal storage me a from a media store to a heat exchange chamber, or vice versa, across a pressure differential, in an apparatus comprising a working fluid circulation pathway, the working fluid circulation pathway comprising a heat exchanger which comprises the heat exchange chamber, wherein the apparatus is a pumped heat energy storage apparatus, the thermal storage media is a solid and the working fluid, as a gas, is brought into direct contact with the thermal storage media in the heat exchange chamber and thereby transfers heat to or from the thermal storage material, the method comprising:
  receiving thermal storage media into at least one transfer chamber in the presence of gaseous working fluid,
  decreasing or increasing the volume of at least one working chamber to thereby compress or expand working fluid in least one transfer chamber while the at least one transfer chamber is fluidically connected to the at least one working chamber, and
  recovering energy from the work done by working fluid on the at least one working chamber while the working fluid expands,
  wherein the thermal storage media is transferred into the at least one transfer chamber from the heat exchange chamber, the volume of the at least one working chamber increases and the working fluid in the at least one transfer chamber is expanded, and then the thermal storage media and at least some of the expanded working fluid is transferred to the heat exchange chamber.

5. A method according to claim 4, wherein working fluid received with thermal storage media from the heat exchanger is used to recover energy by work done in expanding the at least one working chamber, and this takes place with the at least one working chamber connected to the at least one transfer chamber but not to the heat exchanger.

6. A method according to claim 4, wherein when thermal storage media is transferred from the heat exchange chamber into the at least one transfer chamber, along with working fluid, pressurised working fluid in the at least one working chamber is transferred into the heat exchange chamber, optionally wherein the method comprises the step of at the at least one working chamber decreasing in volume and compressing working fluid exchange chamber.

7. A method of transferring thermal storage me a from a media store to a heat exchange chamber, or vice versa, across a pressure differential, in an apparatus comprising a working fluid circulation pathway, the working fluid circulation pathway comprising a heat exchanger which comprises the heat exchange chamber, wherein the apparatus is a pumped heat energy storage apparatus, the thermal storage media is a solid and the working fluid, as a gas, is brought into direct contact with the thermal storage media in the heat exchange chamber and thereby transfers heat to or from the thermal storage material, the method comprising:
   receiving thermal storage media into at least one transfer chamber in the presence of gaseous working fluid,
   decreasing or increasing the volume of at least one working chamber to thereby compress or expand working fluid in least one transfer chamber while the at least one transfer chamber is fluidically connected to the at least one working chamber, and
   recovering energy from the work done by working fluid on the at least one working chamber while the working fluid expands,
   wherein working fluid is pressurised and introduced into the heat exchange chamber periodically or continuously to maintain the mass of working fluid circulating in the working fluid circulation pathway.

8. A method of transferring thermal storage me a from a media store to a heat exchange chamber, or vice versa, across a pressure differential, in an apparatus comprising a working fluid circulation pathway, the working fluid circulation pathway comprising a heat exchanger which comprises the heat exchange chamber, wherein the apparatus is a pumped heat energy storage apparatus, the thermal storage media is a solid and the working fluid, as a gas, is brought into direct contact with the thermal storage media in the heat exchange chamber and thereby transfers heat to or from the thermal storage material, the method comprising:
   receiving thermal storage media into at least one transfer chamber in the presence of gaseous working fluid,
   decreasing or increasing the volume of at least one working chamber to thereby compress or expand working fluid in least one transfer chamber while the at least one transfer chamber is fluidically connected to the at least one working chamber, and
   recovering energy from the work done by working fluid on the at least one working chamber while the working fluid expands,
   wherein at least one transfer chamber is located above the heat exchange chamber and comprises a valve which when actuated allows thermal storage media within the at least one transfer chamber to fall into the heat exchange chamber by gravity, and wherein at least one transfer chamber is located below the heat exchange chamber and comprises a valve which when actuated allows thermal storage media within the heat exchange chamber to fall into the at least one transfer chamber by gravity.

9. A method of transferring thermal storage me a from a media store to a heat exchange chamber, or vice versa, across a pressure differential, in an apparatus comprising a working fluid circulation pathway, the working fluid circulation pathway comprising a heat exchanger which comprises the heat exchange chamber, wherein the apparatus is a pumped heat energy storage apparatus, the thermal storage media is a solid and the working fluid, as a gas, is brought into direct contact with the thermal storage media in the heat exchange chamber and thereby transfers heat to or from the thermal storage material, the method comprising:
   receiving thermal storage media into at least one transfer chamber in the presence of gaseous working fluid,
   decreasing or increasing the volume of at least one working chamber to thereby compress or expand working fluid in least one transfer chamber while the at least one transfer chamber is fluidically connected to the at least one working chamber, and
   recovering energy from the work done by working fluid on the at least one working chamber while the working fluid expands,
   wherein the apparatus comprises first and second media stores for retaining media at different temperatures, a base temperature and an energy storage temperature which is higher or lower than the base temperature,
   wherein during energy storage, thermal storage media is transferred from the first media store to the heat exchange chamber, heated in the heat exchange chamber from direct contact with working fluid, and then stored at a higher temperature than the base temperature in the second media store,
   wherein during energy retrieval, thermal storage media is received from the second media store at a temperature which is higher than base temperature and then used to heat working fluid in the heat exchange chamber by direct contract with working fluid, and then stored in the first media store at base temperature,
   wherein the apparatus is a pumped heat energy storage apparatus comprising a working fluid circulation pathway retaining working fluid and a heat exchanger, the heat exchanger having a heat exchange chamber configured to bring thermal storage media into direct contact with working fluid in the working fluid circulation pathway to thereby exchange heat energy between the working fluid and the thermal storage media,
   wherein the working fluid is a gas within the heat exchange chamber and the thermal storage media is a solid,
   wherein the heat exchanger is configured to cause received thermal storage media to be moved into and out of the heat exchange chamber, and
   wherein the heat exchanger is reversible to transfer heat energy from the working fluid to the thermal storage media or vice versa in alternative first and second operating modes.

10. A pumped heat energy storage apparatus comprising:
   a solid thermal storage media,
   a thermal media store,
   a heat exchanger having a heat exchange chamber,
   a working fluid circulation pathway, the working fluid circulation pathway comprising the heat exchanger, and
   at least one transfer chamber and at least one working chamber,
   wherein the apparatus is at least configured to:
      transfer thermal storage media from the media store to the at least one transfer chamber and then to the beat exchange chamber or from the heat exchange chamber to the at least one transfer chamber and then to the thermal media store,
      decrease or increase the volume of the at least one working chamber to thereby compress of expand working fluid in the at least one transfer chamber while the at least one transfer be is fluidically connected to the at least one working chamber, and
recover energy from the work done by on at least of working chamber while the working fluid is expanded,
wherein the apparatus further comprises a plurality of chambers of variable volume which are operable as a said transfer chamber or a said working chamber in alternative operating modes of the apparatus, optionally wherein in a first operating mode, the first chamber is operable as a said transfer chamber and the second chamber is operable as a said working chamber and in a second operating mode, the first chamber is operable as a said working chamber and the second chamber is operable as a said transfer chamber.

11. A pumped heat energy storage apparatus comprising:
a solid thermal storage media,
a thermal media store,
a heat exchanger having a heat exchange chamber,
a working fluid circulation pathway, the working fluid circulation pathway comprising the heat exchanger, and
at least one transfer chamber and at least one working chamber,
wherein the apparatus is at least configured to:
transfer thermal storage media from the media store to the at least one transfer chamber and then to the beat exchange chamber or from the heat exchange chamber to the at least one transfer chamber and then to the thermal media store,
decrease or increase the volume of the at least one working chamber to thereby compress of expand working fluid in the at least one transfer chamber while the at least one transfer be is fluidically connected to the at least one working chamber, and
recover energy from the work done by on at least of working chamber while the working fluid is expanded,
wherein at least one transfer chamber is located above the heat exchange chamber and wherein the apparatus further comprises a valve which when actuated allows thermal storage media within the at least one transfer chamber to fall into the heat exchange chamber by gravity; and/or
wherein the at least one transfer chamber comprises an outlet, through which thermal storage media may fall out of the at least one transfer chamber by gravity; and/or
wherein at a first end of the heat exchange chamber a first chamber is located above the heat exchange chamber for transferring thermal storage media from a media store into the heat exchange chamber and a second chamber is located below the heat exchange chamber for transferring thermal storage media from the heat exchange chamber into a media store, which may be the same or a different media store, whereby the first and second chambers may therefore each displace thermal storage media into or out of the heat exchange chamber using gravity.

12. Apparatus according to claim 10, wherein at least one chamber is a piston cylinder unit, comprising a cylinder and a piston slidably mounted in the cylinder, and which is operable as a said transfer chamber or as a working chamber, and the apparatus comprises an actuator to input energy during the compression step by driving the piston and a generator, integral with or separate to the actuator, to recover energy from the work done on the piston by expanding working fluid as the volume of the at least one transfer chamber increases.

13. Pumped heat energy storage apparatus comprising
a working fluid circulation pathway retaining working fluid, and
a heat exchanger, the heat exchanger having a heat exchange chamber configured to bring thermal storage media into direct contact with working fluid in the working fluid circulation pathway to thereby exchange heat energy between the working fluid and the thermal storage media,
wherein the working fluid is a gas and the thermal storage media is a solid,
wherein the heat exchanger is configured to cause received thermal storage media to be moved into and out of the heat exchange chamber, and
wherein the heat exchanger is reversible to transfer heat energy from the working fluid to the thermal storage media or vice versa in alternative first and second operating modes, configured so that in a first operating mode, the thermal storage media is received from a first media store into the heat exchanger and in the second operating mode the thermal storage media is output from the heat exchanger and transferred to the first media store, and configured such that in the first operating mode, the thermal storage media is output from the heat exchanger and transferred to a second media store, and that in the second operating mode the thermal storage media received into the heat exchanger from the second media store.

14. A pumped heat energy storage apparatus according to claim 13, wherein the apparatus is configured so that in a first operating mode, the thermal storage media is received from a first media store and moved through the heat exchange chamber in a first direction and wherein in the second operating mode the thermal storage media is moved through the heat exchange chamber in a second direction which is the reverse of the first direction.

15. A pumped heat energy storage apparatus according to claim 13, wherein the apparatus is configured so that in a first operating mode, the thermal storage media is received from a first media store and input into the heat exchanger and that in the second operating mode, the thermal storage media is output from the heat exchanger on a last in first out basis, at least initially when the apparatus changes from the first operating mode to the second operating mode.

16. A pumped heat energy storage apparatus according to claim 13, wherein the thermal storage media comprises discrete particles which have a diameter in range of 5 to 25 mm and the heat exchanger comprises an auger configured to transport the thermal storage media through the heat exchange chamber.

17. A pumped heat energy storage apparatus according to claim 13, wherein the heat exchange apparatus is configured to transport thermal storage media through the heat exchange chamber at a slope of less than ±5°, relative to horizontal.

18. A pumped heat energy storage apparatus according to claim 13, wherein the heat exchanger is located in a section of the working fluid circulation pathway and wherein the direction of gas flow through the section of the working fluid circulation pathway reverses between the first and second operating modes, such that in the first operating mode the gas flows in a first direction from the output of a compressor to the input of an expander and in the second direction the gas flows in the opposite direction from the output of a compressor to the input of an expander.

19. A pumped heat energy storage apparatus according to claim 13, configured such that when the apparatus swaps between the first and the second operating modes, the apparatus swaps between energy storage and energy return or vice versa, the direction of heat energy flow between the working fluid and the thermal storage media reverses and the thermal storage media received from a first media store is returned to the first media store, wherein the direction of flow of the working fluid through the heat exchange chamber reverses and wherein the direction of movement of the thermal storage media through the heat exchange chamber reverses.

20. A pumped heat energy storage apparatus according to claim 13, comprising one or more electronically commutated fluid working machines having a low pressure manifold, a high pressure manifold, a rotatable shaft, and a plurality of working chambers of cyclically varying volume, each working chamber having an electronically controlled low pressure valve which regulates the flow of working fluid between the low pressure manifold and the working chamber and an electronically controlled high pressure valve which regulates the flow of working fluid between the high pressure manifold and the working chamber,
  wherein a controller controls the low and high pressure valves of the working chambers in phased relationship with cycle of working chamber volume to determine the net displacement of working fluid by each working chamber on each cycle of working chamber volume, and
  wherein the controller controls the low and high pressure valves to cause each working chamber to undergo either an inactive cycle with no net displacement of working fluid or an active cycle with a net displacement of working fluid.

21. The method of claim 1, wherein the at least one working chamber is sealed from the at least one transfer chamber after the step of compressing the working fluid and before the step of transferring the thermal storage media and at least some of the compressed working fluid from the transfer chamber to the heat exchange chamber.

22. The method of claim 2, wherein the pressurised working fluid in the at least one working chamber was previously received into the at least one working chamber from the heat exchange chamber when the at least one transfer chamber was connected to the heat exchange chamber.

23. The method of claim 3, wherein when the volume of the at least one working chamber is reduced, the pressure in the at least one transfer chamber is increased to above the pressure in the heat exchange chamber at the location where the thermal storage media is to be introduced.

24. The method of claim 3, wherein after the step of compressing the working fluid in the at least one transfer chamber, the at least one transfer chamber and also the at least one working chamber are connected to the heat exchange chamber and working fluid is allowed to circulate therebetween.

25. The method of claim 3, wherein the method comprises disconnecting the at least one working chamber from the heat exchange chamber and then expanding the working fluid remaining within the at least one working chamber, wherein energy is recovered from this expansion from the work done by the working fluid on the at least one working chamber.

26. The method of claim 4, wherein the at least one working chamber is sealed from the at least one transfer chamber after the step of expanding the working fluid and before the step of transferring the thermal storage media and at least some of the compressed working fluid from the transfer chamber to the media store.

27. The method of claim 9, wherein wherein the heat exchanger is configured to cause received thermal storage media to be moved through the heat exchange chamber.

28. The apparatus of claim 14, wherein, in the second operating mode, the thermal storage media is returned to the first media store.

29. The apparatus of claim 15, wherein the apparatus is further configured so that in the second operating mode, the thermal storage media is output from the heat exchanger and also returned to the first media store on a last in first out basis, at least initially when the apparatus changes from the first operating mode to the second operating mode.

30. The apparatus of claim 15, wherein the apparatus is configured so that in the first operating mode, the thermal storage media is output from the heat exchanger and transferred to a second media store, and that in the second operating mode, the thermal storage media is received from the second media store into the heat exchanger on a last out first in basis.

31. The apparatus of claim 17, wherein the heat exchange apparatus is configured to transport thermal storage media through the heat exchange chamber at a slope of less than ±5°, relative to horizontal, and substantially horizontally.

32. The apparatus of claim 18, wherein in the first operating mode working fluid flows through the heat exchange chamber along one or more first paths and in the second operating mode working fluid flow through the heat exchange chamber in the opposite direction along the one or more first paths.

* * * * *